(12) United States Patent
Kuriki et al.

(10) Patent No.: US 9,806,334 B2
(45) Date of Patent: Oct. 31, 2017

(54) POWER STORAGE DEVICE ELECTRODE, METHOD FOR FORMING THE SAME, POWER STORAGE DEVICE, AND ELECTRICAL DEVICE

(71) Applicant: SEMICONDUCTOR ENERGY LABORATORY CO., LTD., Atsugi-shi, Kanagawa-ken (JP)

(72) Inventors: Kazutaka Kuriki, Kanagawa (JP); Kai Kimura, Kanagawa (JP); Nobuhiro Inoue, Kanagawa (JP); Ryota Tajima, Kanagawa (JP); Tamae Moriwaka, Kanagawa (JP); Kiyofumi Ogino, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 372 days.

(21) Appl. No.: 14/060,674

(22) Filed: Oct. 23, 2013

(65) Prior Publication Data
US 2014/0127566 A1    May 8, 2014

(30) Foreign Application Priority Data

Nov. 2, 2012  (JP) ................. 2012-242706

(51) Int. Cl.
*H01M 4/62*  (2006.01)
*H01M 4/66*  (2006.01)
(Continued)

(52) U.S. Cl.
CPC ............ *H01M 4/366* (2013.01); *H01G 11/06* (2013.01); *H01G 11/28* (2013.01); *H01M 4/667* (2013.01);
(Continued)

(58) Field of Classification Search
CPC ........ H01M 4/04; H01M 4/366; H01M 4/136; H01M 4/667; H01M 10/4235; H01G 11/06; H01G 11/28; H01B 1/122
See application file for complete search history.

(56) References Cited

U.S. PATENT DOCUMENTS 6,218,050 B1    4/2001  Yoon et al.
2002/0155354 A1*  10/2002  Wariishi .............. H01B 1/122
                                                                                          429/317
(Continued)

FOREIGN PATENT DOCUMENTS

CN    102420339    4/2012
CN    103155247    6/2013
(Continued)

OTHER PUBLICATIONS

Machine Translation of: Sam (JP 11/273680A), Oct. 8, 1999.*
(Continued)

*Primary Examiner* — Kenneth Douyette
(74) *Attorney, Agent, or Firm* — Nixon Peabody LLP; Jeffrey L. Costellia

(57) ABSTRACT

Irreversible capacity which causes a decrease in the charge and discharge capacity of a power storage device is reduced, and electrochemical decomposition of an electrolyte solution and the like on a surface of an electrode is inhibited. Further, the cycle characteristics of the power storage device is improved by reducing or inhibiting a decomposition reaction of the electrolyte solution and the like occurring as a side reaction in repeated charging and discharging of the power storage device. A power storage device electrode includes a current collector and an active material layer that is over the current collector and includes a binder and an active material. A coating film is provided on at least part of a surface of the active material. The coating film is spongy.

11 Claims, 20 Drawing Sheets

(51) Int. Cl.
  *H01M 4/36* (2006.01)
  *H01G 11/06* (2013.01)
  *H01G 11/28* (2013.01)
  *H01M 10/42* (2006.01)

(52) U.S. Cl.
  CPC ......... *H01M 10/4235* (2013.01); *Y02E 60/13* (2013.01); *Y02P 70/54* (2015.11); *Y02T 10/7022* (2013.01)

(56) References Cited

U.S. PATENT DOCUMENTS

| | | | |
|---|---|---|---|
| 2003/0181561 A1* | 9/2003 | Li | H01M 4/04 524/425 |
| 2007/0259271 A1* | 11/2007 | Nanno | H01M 2/0267 429/318 |
| 2008/0206651 A1 | 8/2008 | Kawase et al. | |
| 2009/0061319 A1* | 3/2009 | Kim | H01M 4/366 429/220 |
| 2009/0148778 A1 | 6/2009 | Kawase et al. | |
| 2010/0311879 A1* | 12/2010 | Rieke | C08G 61/10 524/157 |
| 2011/0177396 A1 | 7/2011 | Moriwaka et al. | |
| 2011/0291240 A1 | 12/2011 | Yamazaki | |
| 2012/0121981 A1 | 5/2012 | Harimoto et al. | |
| 2012/0141866 A1 | 6/2012 | Kuriki et al. | |
| 2012/0183851 A1* | 7/2012 | Hara | H01M 4/136 429/211 |
| 2013/0052528 A1 | 2/2013 | Kuriki et al. | |
| 2013/0266858 A1 | 10/2013 | Inoue et al. | |
| 2013/0323585 A1 | 12/2013 | Inoue et al. | |
| 2014/0087251 A1 | 3/2014 | Takahashi et al. | |
| 2014/0099554 A1 | 4/2014 | Inoue et al. | |
| 2014/0127567 A1 | 5/2014 | Kuriki et al. | |

FOREIGN PATENT DOCUMENTS

| | | |
|---|---|---|
| EP | 2461397 A | 6/2012 |
| JP | 07-034036 A | 2/1995 |
| JP | 11-096993 | 4/1999 |
| JP | 11-273680 | 10/1999 |
| JP | 2003-115296 A | 4/2003 |
| JP | 2003-263987 A | 9/2003 |
| JP | 2004-014381 | 1/2004 |
| JP | 2005-302510 | 10/2005 |
| JP | 2005-332769 | 12/2005 |
| JP | 2009-038001 A | 2/2009 |
| JP | 2010-244847 | 10/2010 |
| JP | 2010-287470 A | 12/2010 |
| JP | 2012-074166 A | 4/2012 |
| JP | 2012-121149 A | 6/2012 |
| JP | 2012-195249 A | 10/2012 |
| KR | 2012-0032413 A | 4/2012 |
| KR | 2013-0054467 A | 5/2013 |
| TW | 201112474 | 4/2011 |
| WO | WO-2012/049967 | 4/2012 |

OTHER PUBLICATIONS

Zempachi Ogumi et al., "6.1.6 Influence of Electrolytic Solution and Surface Film Formation,", Lithium secondary battery, Mar. 20, 2008, pp. 116-124, Ohmsha.

International Search Report (Application No. PCT/JP2013/079473) Dated Feb. 10, 2014.

Written Opinion (Application No. PCT/JP2013/079473) Dated Feb. 10, 2014.

Zempachi Ogumi et al., "6.1.6 Influence of Electrolytic Solution and Surface Film Formation", Lithium secondary battery, Mar. 20, 2008, pp. 116-125, Ohmsha.

Taiwanese Office Action (Application No. 102138906) dated Aug. 24, 2017.

\* cited by examiner

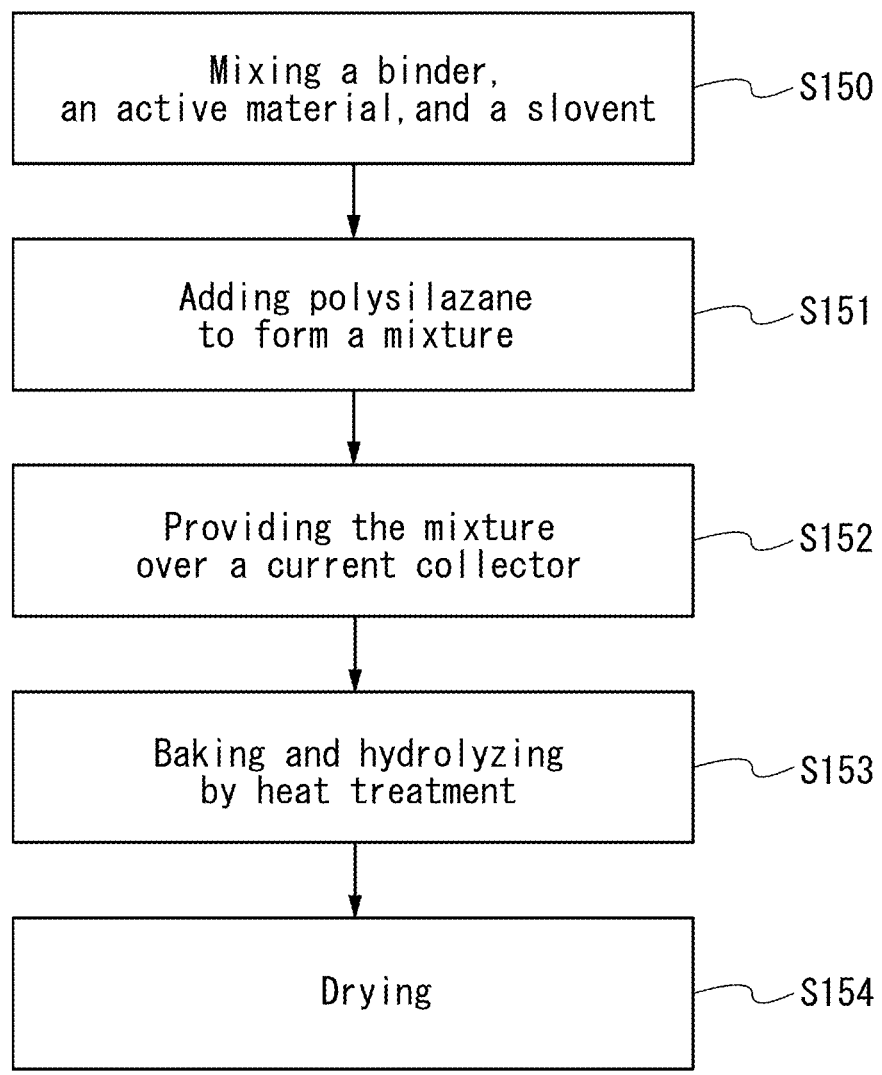

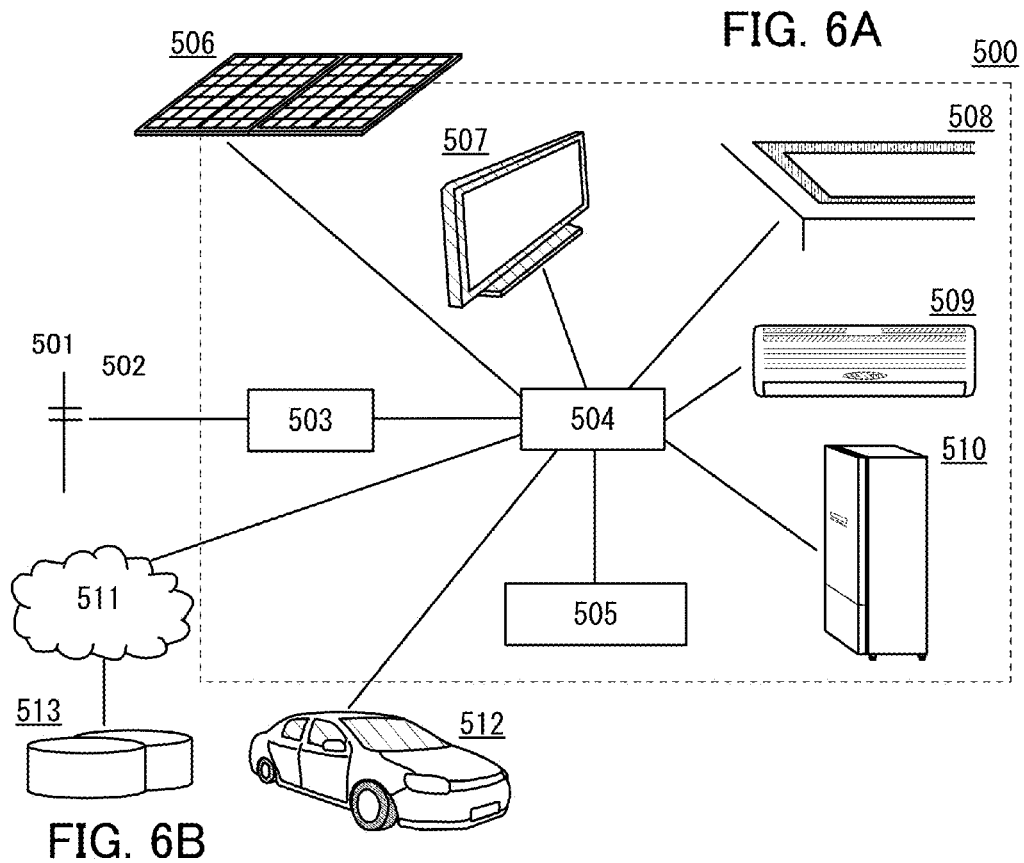
FIG. 6A
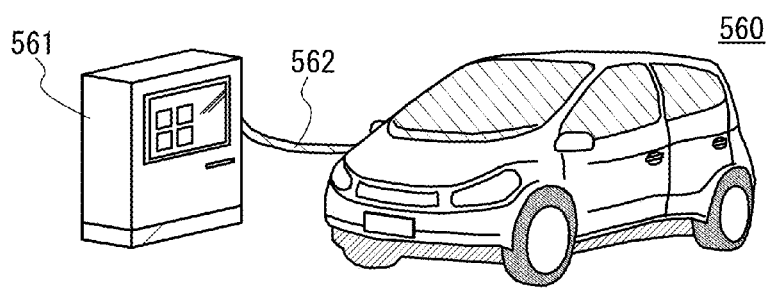
FIG. 6B
FIG. 6C

FIG. 11A  Bright-field-STEM
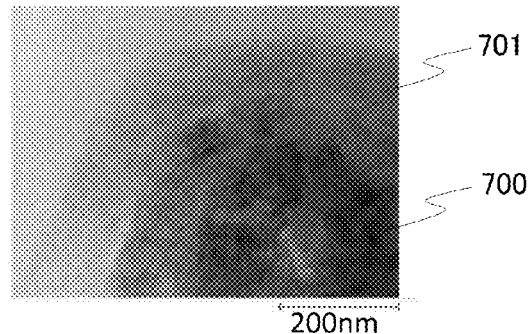
FIG. 11B
C-K image
FIG. 11C
F-K image
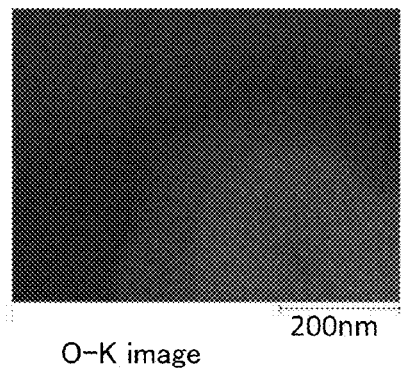
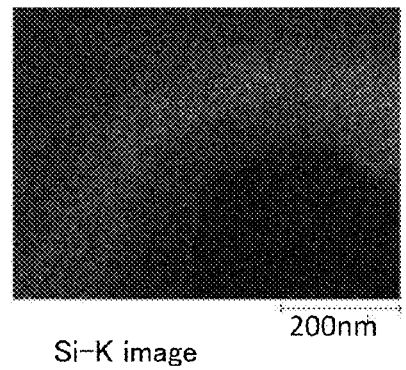
O-K image
Si-K image
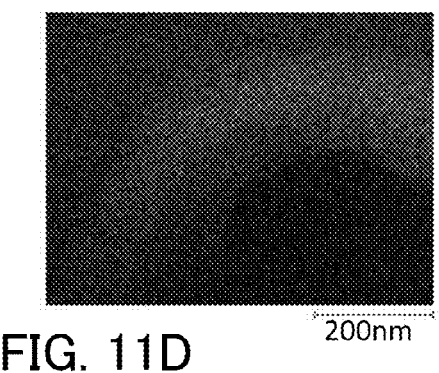
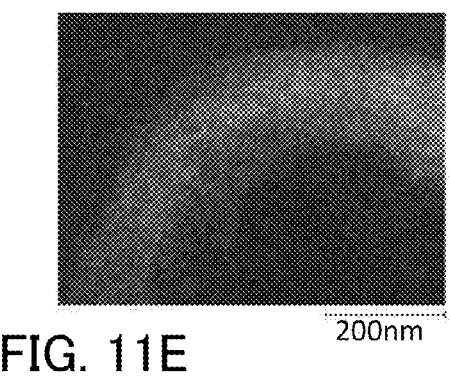
FIG. 11D
FIG. 11E

POWER STORAGE DEVICE ELECTRODE, METHOD FOR FORMING THE SAME, POWER STORAGE DEVICE, AND ELECTRICAL DEVICE

TECHNICAL FIELD

The present invention relates to a power storage device electrode and a method for forming the power storage device electrode.

BACKGROUND ART

In recent years, various power storage devices such as secondary batteries including lithium-ion secondary batteries and the like, lithium ion capacitors, and air cells have been actively developed. In particular, demand for lithium-ion secondary batteries with high output and high energy density has rapidly grown with the development of the semiconductor industry, for electrical devices, for example, portable information terminals such as mobile phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as chargeable energy supply sources for today's information society.

A negative electrode for power storage devices such as lithium-ion secondary batteries and the lithium ion capacitors is a structure body including at least a current collector (hereinafter also referred to as a negative electrode current collector) and an active material layer (hereinafter also referred to as a negative electrode active material layer) provided over a surface of the negative electrode current collector. The negative electrode active material layer contains an active material (hereinafter also referred to as a negative electrode active material) which can occlude and release lithium ions serving as carrier ions and formed of a carbon material, an alloy material, or the like.

At present, a negative electrode containing a graphite-based carbon material is commonly used as a negative electrode for a lithium-ion secondary battery and is formed, for example, in the following manner: graphite as a negative electrode active material, acetylene black (AB) as a conductive additive, and PVDF which is a resin as a binder are mixed to form slurry, the slurry is applied over a current collector, and the slurry is dried.

Such a negative electrode for a lithium-ion secondary battery or a lithium-ion capacitor has an extremely low electrode potential and a high reducing ability. For this reason, an electrolyte solution using an organic solvent is reductively decomposed. The range of potentials in which the electrolysis of an electrolyte solution does not occur is referred to as a potential window. The negative electrode essentially needs to have an electrode potential within the potential window of the electrolyte solution. However, the negative electrode potentials of a lithium-ion secondary battery or a lithium-ion capacitor are out of the potential windows of almost all electrolyte solutions. Actually, a decomposition product of the electrolysis forms a surface film on the surface of the negative electrode, and the surface film inhibits further reductive decomposition. Consequently, lithium ions can be inserted into the negative electrode with the use of a low electrode potential below the potential window of the electrolyte solution (e.g., Non-Patent Document 1).

However, since such a surface film formed of the decomposition product kinetically inhibits the decomposition of the electrolyte solution, deterioration gradually occurs. Therefore, it cannot be said that such a surface film is sufficiently stable. The decomposition reaction speeds up particularly at high temperature; thus, the decomposition reaction hinders operation of a battery in high temperature environments. In addition, the formation of the surface film causes irreversible capacity, resulting in a partial loss of charge and discharge capacity. For these reasons, there is demand for an artificial coating film which is different from the surface film, that is, an artificial coating film on the surface of the negative electrode which is more stable and can be formed without losing capacity.

Further, such a surface film has extremely small electric conductivity, which lowers the electric conductivity of an electrode while a battery is charged and discharged. For this reason, electrode potential distribution is inhomogeneous. Consequently, the charge and discharge capacity of the battery is low, and the cycle life of the battery is short due to local charge and discharge.

On the other hand, at present, a lithium-containing complex phosphate or the like is used as an active material in a positive electrode for a lithium-ion secondary battery. The decomposition reaction between such a material and an electrolyte solution occurs at high temperature and high voltage; accordingly, a surface film is formed due to the decomposition product. Therefore, as in the negative electrode, irreversible capacity is caused in the positive electrode, resulting in a decrease in charge and discharge capacity.

Here, Patent Document 1 discloses that, to prevent deterioration of charge and discharge cycle characteristics and life properties caused by an active material dropping off from a current collector, perhydropolysilazane is used in combination with a binder which is a fluorine macromolecule, and an electrode mix using the perhydropolysilazane, the binder, and a positive electrode material is applied to a current collector and then heated to form an electrode coated with a complex film of the perhydropolysilazane and the binder.

In addition, Patent Document 2 discloses that a carbon particle coated with a thin metal film on its surface or inside by a metal alkoxide treatment method, a sol-gel method, or the like is used to form a negative electrode for a lithium secondary battery with improved cycle characteristics or the like.

REFERENCE

[Patent Document 1] Japanese Published Patent Application No. H11-273680
[Patent Document 2] Japanese Published Patent Application No. 2005-332769

Non-Patent Document

[Non-Patent Document 1] Zempachi Ogumi, "Lithium Secondary Battery", Ohmsha, Ltd., the first impression of the first edition published on March, 20, H20, pp. 116-118

DISCLOSURE OF INVENTION

Conventionally, a surface film on a surface of an electrode is considered as being formed due to a battery reaction in charging. An electric charge used in the formation of the surface film cannot be used in discharging, and irreversible capacity resulting from the electric charge reduces charge and discharge capacity of a lithium-ion secondary battery.

Further, it has been believed that even a surface film formed on an electrode in initial charging is not sufficiently stable and does not completely inhibit the decomposition of an electrolyte solution, and the decomposition of the electrolyte solution proceeds particularly at high temperature.

As the electrochemical decomposition of the electrolyte solution takes place, the amount of lithium responsible for charge and discharge is decreased in response to the number of electrons used in the decomposition reaction of the electrolyte solution. Therefore, as charging and discharging are repeated, the charge and discharge capacity of a lithium-ion secondary battery is lost after a while. In addition, the higher the temperature is, the faster the electrochemical reaction is. Thus, the charge and discharge capacity of the lithium-ion secondary battery decreases more significantly as charging and discharging are repeated at high temperature.

In addition, in the case of forming a coating film on an active material by a metal alkoxide treatment method or a sol-gel method which is disclosed in Patent Document 2, the number of treatment steps is increased, leading to a decrease in productivity of a power storage device.

The present inventors formed an electrode including an active material layer in which a coating film is formed on a surface of an active material with the use of polysilazane as disclosed in Patent Document 1, and measured the cycle characteristics thereof (the measurement is described later in detail in a comparative example).

As a result, although the cycle characteristics were increased, the cycle characteristics at 60° C. showed the deterioration of the charge and discharge capacity. It was found that the effect of the coating film was insufficient. Measurement of the cycle deterioration of the power storage device at high temperature can be regarded as an acceleration test. In other words, this indicates that due to repeated charging and discharging, the charge and discharge capacity is decreased in a short time even at room temperature.

Not only lithium-ion secondary batteries but also power storage devices such as lithium-ion capacitors have the above problems.

In view of the above, an object of one embodiment of the present invention is to reduce irreversible capacity which causes a decrease in the charge and discharge capacity of a power storage device and to reduce or inhibit the electrochemical decomposition of an electrolyte solution and the like on a surface of an electrode.

Another object of one embodiment of the present invention is to reduce or inhibit the decomposition reaction of an electrolyte solution and the like occurring as a side reaction in repeated charging and discharging of a power storage device in order to improve the cycle characteristics of the power storage device.

Another object of one embodiment of the present invention is to reduce or inhibit the decomposition reaction of an electrolyte solution, which speeds up at high temperature, and to prevent a decrease in charge and discharge capacity in charging and discharging at high temperature, in order to extend the operating temperature range of a power storage device.

Furthermore, another embodiment of the present invention is to form a power storage device electrode using an active material provided with a coating film without significantly increasing the number of formation steps, as compared with the case of a method for forming a conventional power storage device electrode in which a coating film is not formed.

In particular, one embodiment of the present invention can achieve at least one of the above objects.

Further, one embodiment of the present invention provides a method for forming a power storage device electrode which achieves at least one of the above objects. One embodiment of the present invention provides a power storage device electrode which achieves at least one of the above objects. One embodiment of the present invention provides a power storage device which achieves at least one of the above objects.

The present inventors have made studies diligently to achieve the above objects. As a result, it is found that in the case of using a binder containing a carboxyl group (—COOH), a spongy coating film was formed due to the interaction between an —OH group included in the carboxyl group and polysilazane. In addition, the present inventors have found that an electrode using the spongy coating film has excellent cycle characteristics.

Here, FIG. 19 illustrates a measurement result of a chemical reaction between the binder containing a carboxyl group and polysilazane. In the measurement, a Fourier transform infrared spectroscopic (FT-IR) analysis was performed on a polyvinylidene fluoride (PVdF) film (results of which is shown by the thin line) obtained by applying a binder (PVdF) dispersed in an N-methyl-2-pyrrolidone (NMP) solution over a substrate and then drying, and a PVdF and silicon oxide film (results of which is shown by the thick line) obtained by applying PVdF dispersed in an NMP solution to which perhydropolysilazane was added over a substrate and then drying. The horizontal axis represents the wavenumber ($cm^{-1}$) and the vertical axis represents the absorbance (arbitrary unit).

A peak of carboxylic acid C=O stretching is positioned around a wavenumber of 1750 $cm^{-1}$ that is shown by the dotted line in FIG. 19. In a spectrum of the PVdF containing the carboxyl group shown by the thin line, a peak can be observed around the wavenumber of 1750 $cm^{-1}$. On the other hand, in a spectrum of the PVdF and silicon oxide film in which perhydropolysilazane is added to PVdF and which is shown by the thick line, a peak with reduced strength is observed around the wavenumber of 1750 $cm^{-1}$ or a peak shifts from the wavenumber of 1750 $cm^{-1}$.

Consequently, there are probably some interactions between PVdF and perhydropolysilazane. That is, carboxylic acid probably contributes to a reaction where perhydropolysilazane is changed into silicon oxide.

Here, perhydropolysilazane forms silicon oxide through a reaction shown by Reaction Formula 1 below.

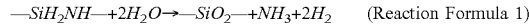

$$—SiH_2NH—+2H_2O \rightarrow —SiO_2—+NH_3+2H_2 \quad \text{(Reaction Formula 1)}$$

It is assumed that in Reaction Formula 1, perhydropolysilazane forms silicon oxide through a state of an intermediate to which an —OH group (—OH) is added. When such a reaction occurs, —OH in a carboxyl group contained in PVdF reacts with perhydropolysilazane to generate ammonium ($NH_3$) and hydrogen ($H_2$). This reaction probably starts in a step for forming slurry at room temperature in which PVdF and perhydropolysilazane are mixed. For this reason, a coating film formed as a result is a spongy or porous film having a number of pores due to an evolved gas such as ammonium.

With an electrode including an active material layer containing an active material whose surface is partly covered with such a spongy coating film, a power storage device having excellent charge and discharge cycle characteristics and the like can be provided.

One embodiment of the present invention is a power storage device electrode including a current collector; an active material layer that is over the current collector and includes a binder and an active material; and a coating film provided on at least part of a surface of the active material. The coating film is spongy.

A material which enables a charge-discharge reaction by insertion and extraction of carrier ions is used as the active material of the power storage device electrode that is one embodiment of the present invention, and in particular, such a material having a particle shape is used.

Here, "particle" is used to indicate the exterior shape of an active material having a given surface area, such as a spherical shape (powder shape), a plate shape, a horn shape, a columnar shape, a needle shape, or a flake shape. Active material particles are not necessarily in spherical shapes and the particles may have given shapes different from each other. A method for forming the active material particles is not limited as long as the active material particles have any of the above-described shapes.

There is no particular limitation on the average diameter of the active material particles; active material particles with a general average diameter or diameter distribution are used. When the active material particles are negative electrode active material particles used for a negative electrode, the negative electrode active material particles can have an average diameter within the range of 1 μm to 50 μm, for example. When the active material particles are positive electrode active material particles used for a positive electrode and each of the positive electrode active material particles is a secondary particle, the average diameter of primary particles included in the secondary particle can be within the range of 10 nm to 1 μm.

Further, there is no particular limitation on the shape of the active material; even when a film of the active material or a stack of a plurality of films of the active material is used, by forming the coating film of one embodiment of the present invention thereover, an effect similar to that in the case of the active material particles can be obtained.

For a material of the negative electrode active material, graphite that is a carbon material generally used in the field of power storage can be used. Examples of graphite include low crystalline carbon, such as soft carbon and hard carbon, and high crystalline carbon, such as natural graphite, kish graphite, pyrolytic carbon, mesophase pitch based carbon fiber, meso-carbon microbeads (MCMB), mesophase pitches, petroleum coke, and coal-based coke.

As the negative electrode active material, other than the above carbon materials, an alloy-based material which enables a charge-discharge reaction by an alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, and In can be used as the alloy-based material. Such metals have higher capacity than graphite. In particular, silicon has a significantly high theoretical capacity of 4200 mAh/g. For this reason, silicon is preferably used as the negative electrode active material.

For a positive electrode active material, a material into and from which carrier ions can be inserted and extracted is used. For example, a compound such as $LiFeO_2$, $LiCoO_2$, $LiNiO_2$, $LiMn_2O_4$, $V_2O_5$, $Cr_2O_5$, or $MnO_2$ can be used.

Alternatively, a lithium-containing complex phosphate ($LiMPO_4$ (general formula) (M is one or more of Fe(II), Mn(II), Co(II), and Ni(II))) can be used for the positive electrode active material. Typical examples of the general formula $LiMPO_4$ are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1).

Further alternatively, a lithium-containing complex silicate such as $Li_2MSiO_4$ (general formula) (M is one or more of Fe(II), Mn(II), Co(II), and Ni(II)) can be used. Typical examples of the general formula $Li_2MSiO_4$ are $Li_2FeSiO_4$, $Li_2NiSiO_4$, $Li_2CoSiO_4$, $Li_2MnSiO_4$, $Li_2Fe_kNi_lSiO_4$, $Li_2Fe_kCo_lSiO_4$, $Li_2Fe_kMn_lSiO_4$, $Li_2Ni_kCo_lSiO_4$, $Li_2Ni_kMn_lSiO_4$ (k+l≤1, 0<k<1, and 0<l<1), $Li_2Fe_mNi_nCo_qSiO_4$, $Li_2Fe_mNi_nMn_qSiO_4$, $Li_2Ni_mCo_nMn_qSiO_4$ (m+n+q≤1, 0<m<1, 0<n<1, and 0<q<1), and $Li_2Fe_rNi_sCo_tMn_uSiO_4$ (r+s+t+u≤1, 0<r<1, 0<s<1, 0<t<1, and 0<u<1).

Examples of carrier ions used for a power storage device are lithium ions, which are a typical example thereof; alkali-metal ions other than lithium ions; and alkaline-earth metal ions. In the case where such ions other than lithium ions are used as carrier ions, the following may be used as the positive electrode active material: a compound which is obtained by substituting an alkali metal (e.g., sodium or potassium) or an alkaline-earth metal (e.g., calcium, strontium, barium, beryllium, or magnesium) for lithium in any of the above lithium compounds, the lithium-containing complex phosphate, and the lithium-containing complex silicate.

The coating film of one embodiment of the present invention is artificially provided before a power storage device is charged and discharged, and is clearly distinguished from a surface film formed due to the decomposition reaction between an electrolyte solution and an active material in this specification and the like. Thus, in this specification and the like, the coating film is described as distinguished from the surface film.

Carrier ions can pass through the coating film of one embodiment of the present invention. The coating film needs to be formed using a material through which carrier ions can pass and to be thin enough to allow carrier ions to pass through the film.

Silicon oxide can be used as a material for the coating film of one embodiment of the present invention. In particular, in one embodiment of the present invention, silicon oxide contains at least carbon (C) and fluorine (F) as main components in addition to silicon (Si) and oxygen (O). The coating film has fewer pores than a conventional surface film formed on a surface of an active material due to a decomposition product of an electrolyte solution.

In the case of using an active material whose volume is changed in charging and discharging, the shape of the coating film is preferably changed following a change in shape of the active material due to the change in volume. Therefore, the Young's modulus of the coating film is preferably less than or equal to 70 GPa.

"The coating film is spongy" means that the coating film has a number of pores inside or on its surface (i.e., a porous film). Further, the shape of the film can also be regarded as a net-like skeleton formed of an irregular arrangement of thin stripe active materials.

In addition, one embodiment of the present invention is a method for forming a power storage device electrode including steps of forming a first mixture including a binder that contains a carboxyl group and an active material; forming a second mixture by adding polysilazane to the first mixture; providing the second mixture over at least one surface of a current collector; and performing heat treatment to bake the second mixture and to hydrolyze the polysilazane so that a coating film covering at least part of a surface of the active material is formed. The carboxyl group reacts with the polysilazane to generate a gas during the steps of forming the second mixture and forming the coating film.

Note that in this specification and the like, a positive electrode and a negative electrode may be collectively referred to as an electrode; in this case, the electrode refers to at least one of the positive electrode and the negative electrode.

One embodiment of the present invention can reduce irreversible capacity which causes a decrease in the charge and discharge capacity of a power storage device and reduce or inhibit the electrochemical decomposition of an electrolyte solution and the like on a surface of an electrode.

One embodiment of the present invention can improve the cycle characteristics of the power storage device by reducing or inhibiting the decomposition reaction of an electrolyte solution and the like occurring as a side reaction in repeated charging and discharging of a power storage device.

One embodiment of the present invention can extend the operating temperature range of a power storage device by reducing or inhibiting the decomposition reaction of an electrolyte solution, which speeds up at high temperature, and preventing a decrease in charge and discharge capacity in charging and discharging at high temperature.

One embodiment of the present invention is to form a power storage device electrode using an active material provided with a coating film without significantly increasing the number of formation steps, as compared with the case of a method for forming a conventional power storage device electrode in which a coating film is not formed.

One embodiment of the present invention can provide a method for forming a power storage device electrode which achieves at least one of the above objects. One embodiment of the present invention can provide a power storage device electrode which achieves at least one of the above objects. One embodiment of the present invention can provide a power storage device which achieves at least one of the above objects.

BRIEF DESCRIPTION OF DRAWINGS

FIG. 3 illustrates a method for forming a power storage device electrode.

FIGS. 6A to 6C illustrate electrical devices.

FIGS. 11A to 11E are element mapping images of an active material layer.

BEST MODE FOR CARRYING OUT THE INVENTION

Figure 1A:
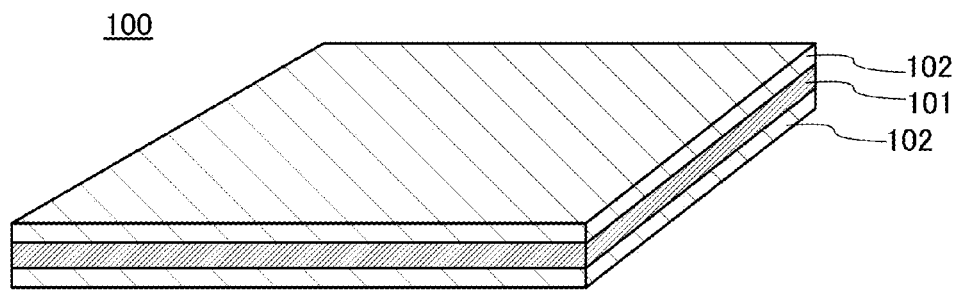
FIGS. 1A to 1C illustrate a power storage device electrode.

Embodiments and examples of the present invention are described below in detail with reference to the drawings. However, the present invention is not limited to the descriptions of the embodiments and examples and it is easily understood by those skilled in the art that the mode and details can be changed variously. Therefore, the present invention should not be construed as being limited to the description in the following embodiments and examples.

Note that in drawings used in this specification, the thicknesses of films, layers, and substrates and the sizes of components (e.g., the sizes of regions) are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. In addition, the ordinal numbers in this specification and the like do not denote particular names which specify the present invention.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

Note that in this specification and the like, a positive electrode and a negative electrode for a power storage device may be collectively referred to as a power storage device electrode; in this case, the power storage device electrode refers to at least one of the positive electrode and the negative electrode for the power storage device.

Note that in this specification and the like, a charging rate C refers to the rate at which a secondary battery is charged. For example, the charging rate in the case of charging a battery having a capacity of 1 Ah with 1 A is 1 C. In addition, a discharging rate C refers to the rate at which a secondary battery is discharged. For example, the discharging rate in the case of discharging a battery having a capacity of 1 Ah with 1 A is 1 C.

Embodiment 1

In this embodiment, a power storage device electrode of one embodiment of the present invention is described with reference to FIGS. 1A to 1C.

Figure 1B:
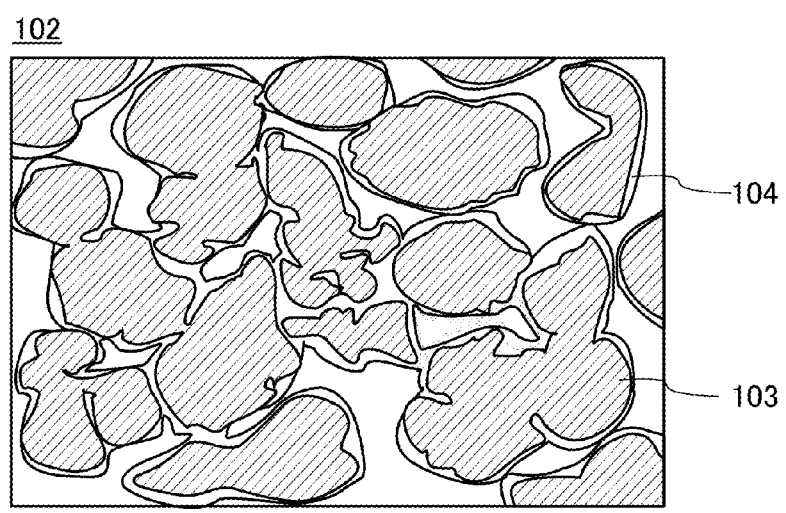
Figure 1C:
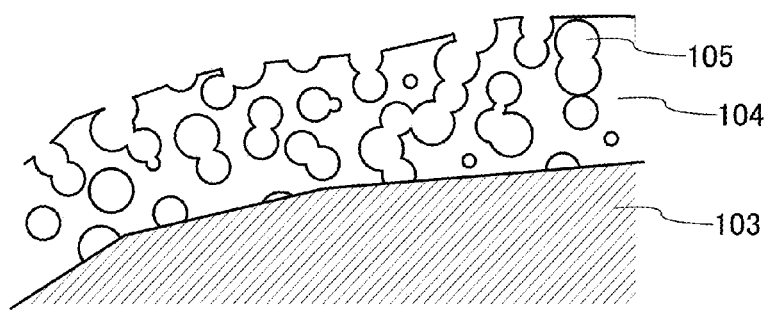

FIGS. 1A to 1C illustrate a power storage device electrode 100 of one embodiment of the present invention. FIG. 1A is a perspective view of the power storage device electrode 100. In the power storage device electrode 100, an active material layer 102 is formed on both surfaces of a current collector 101 (although not illustrated, the active material layer 102 may be formed on one of the surfaces of the current collector 101).

The current collector 101 can be formed using a material having high conductivity such as a metal typified by stainless steel, gold, platinum, zinc, iron, copper, aluminum, or titanium, or an alloy thereof. Alternatively, the current collector 101 can be formed using an aluminum alloy to which an element which improves heat resistance, such as silicon, titanium, neodymium, scandium, or molybdenum, is added. Further alternatively, the current collector 101 may be formed using a metal element which forms silicide by reacting with silicon. Examples of the metal element which forms silicide by reacting with silicon are zirconium, titanium, hafnium, vanadium, niobium, tantalum, chromium, molybdenum, tungsten, cobalt, and nickel. The current collector 101 can have a foil-like shape, a plate-like shape (sheet-like shape), a net-like shape, a punching-metal shape, an expanded-metal shape, or the like as appropriate.

The active material layer 102 is provided on one or both surfaces of the current collector 101. FIG. 1B schematically illustrates a cross-section of the active material layer 102 in the thickness direction.

The active material layer 102 includes an active material 103, a coating film 104 covering at least part of a surface of the active material, and a binder.

When the active material 103 is a negative electrode active material, graphite which is a carbon material generally used in the field of power storage can be used. Examples of graphite are low crystalline carbon, such as soft carbon and hard carbon, and high crystalline carbon, such as natural graphite, kish graphite, pyrolytic carbon, mesophase pitch based carbon fiber, meso-carbon microbeads (MCMB), mesophase pitches, petroleum coke, and coal-based coke.

As the negative electrode active material, other than the above carbon materials, an alloy-based material which enables a charge-discharge reaction by an alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, and In can be used as the alloy-based material. Such metals have higher capacity than graphite. In particular, silicon has a significantly high theoretical capacity of 4200 mAh/g. For this reason, silicon is preferably used as the negative electrode active material.

When the active material 103 is a positive electrode active material, a material into and from which carrier ions can be inserted and extracted is used. For example, a compound such as $LiFeO_2$, $LiCoO_2$, $LiNiO_2$, $LiMn_2O_4$, $V_2O_5$, $Cr_2O_5$, or $MnO_2$ can be used.

Alternatively, a lithium-containing complex phosphate ($LiMPO_4$ (general formula) (M is one or more of Fe(II), Mn(II), Co(II), and Ni(II))) can be used for the positive electrode active material. Typical examples of the general formula $LiMPO_4$ are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\le1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\le1$, $0<c<1$, $0<d<1$, and $0<e<1$), and $LiFe_fNi_gCo_hMn_iPO_4$ ($f+g+h+i\le1$, $0<f<1$, $0<g<1$, $0<h<1$, and $0<i<1$).

Further alternatively, a lithium-containing complex silicate such as $Li_2MSiO_4$ (general formula) (M is one or more of Fe(II), Mn(II), Co(II), and Ni(II)) can be used. Typical examples of the general formula $Li_2MSiO_4$ are $Li_2FeSiO_4$, $Li_2NiSiO_4$, $Li_2CoSiO_4$, $Li_2MnSiO_4$, $Li_2Fe_kNi_lSiO_4$, $Li_2Fe_kCo_lSiO_4$, $Li_2Fe_kMn_lSiO_4$, $Li_2Ni_kCo_lSiO_4$, $Li_2Ni_kMn_lSiO_4$ ($k+l\le1$, $0<k<1$, and $0<l<1$), $Li_2Fe_mNi_nCo_qSiO_4$, $Li_2Fe_mNi_nMn_qSiO_4$, $Li_2Ni_mCo_nMn_qSiO_4$ ($m+n+q\le1$, $0<m<1$, $0<n<1$, and $0<q<1$), and $Li_2Fe_rNi_sCo_tMn_uSiO_4$ ($r+s+t+u\le1$, $0<r<1$, $0<s<1$, $0<t<1$, and $0<u<1$).

Examples of carrier ions used for a power storage device are lithium ions, which are a typical example thereof; alkali-metal ions other than lithium ions; and alkaline-earth metal ions. In the case where such ions other than lithium ions are used as carrier ions, the following may be used as the positive electrode active material: a compound which is obtained by substituting an alkali metal (e.g., sodium or potassium) or an alkaline-earth metal (e.g., calcium, strontium, barium, beryllium, or magnesium) for lithium in any of the above lithium compounds, the lithium-containing complex phosphate, and the lithium-containing complex silicate.

In FIG. 1B, a plurality of active material particles are illustrated as the active material 103. There is no particular limitation on the average diameter of the active material particles; active material particles with a general average diameter or diameter distribution are used. When the active material particles are negative electrode active material particles used for a negative electrode, the negative electrode active material particles can have an average diameter within the range of 1 μm to 50 μm, for example. When the active material particles are positive electrode active material particles used for a positive electrode and each of the positive electrode active material particles is a secondary particle, the average diameter of primary particles included in the secondary particle can be within the range of 10 nm to 1 μm.

The coating film 104 does not completely electrically insulate the active material particles; some of the active material particles are in contact with each other to form aggregates. Surfaces of the aggregates are covered with the coating film 104. In FIG. 1B, although being covered with the coating film 104, the aggregates are connected in the depth direction; thus, the active material particles are three-dimensionally in contact with one another to form a conductive path.

The coating film 104 does not necessarily cover the whole surface of the active material particle or the aggregate, and covers at least part of the surface. When the active material particles are completely electrically insulated, free movement of electrons inside and outside the active material particles is regulated, which makes it difficult for a battery reaction to occur. In some cases, a partly exposed surface of the active material particle is in contact with another active material particle to ensure electric conductivity.

Carrier ions can pass through the coating film 104. The coating film needs to be formed using a material through which carrier ions can pass, and to be thin enough to allow carrier ions to pass through the coating film. The coating film 104 may have a thickness of more than or equal to 10 nm and less than or equal to 10 μm, for example.

In the case of using an active material whose volume is changed in charging and discharging as the active material 103, the shape of the coating film 104 is preferably changed following a change in shape of the active material 103 due to the change in volume. Therefore, the Young's modulus of the coating film is preferably less than or equal to 70 GPa.

FIG. 1C is a schematic view of an enlarged cross-section of part of the coating film 104 on the active material 103. The coating film 104 is a spongy film having a number of pores 105 on its surface or inside. In other words, the coating film 104 is porous. The pores 105 are formed in given positions such as a position on the surface of the coating film 104 and a position inside the coating film 104. The pores 105 are bonded to extend from the surface of the coating film 104 to the surface of the active material 103 in some cases. The pores 105 extend in the depth direction in FIG. 1C. Thus, the coating film 104 includes a portion where the pores 105 are connected to each other to spread in a net-like shape. In other words, the coating film 104 has a hollow structure in which thin stripe portions other than the pores 105 form a net-like skeleton.

There is no particular limitation on the diameter of the pores 105. The diameter is preferably smaller than the thickness of the coating film 104. For example, the pores 105 can each have a diameter of more than or equal to 1 nm and less than or equal to 1 μm. In the coating film 104, the density of the pores 105 is preferably high, that is, it is preferable that the coating film 104 have a large number of pores and be entirely hollow.

Such a spongy shape of the coating film 104 is probably formed as an outflow pathway of a gas of ammonium or the like generated when the coating film is formed.

Carrier ions can pass through the coating film 104. The coating film needs to be formed using a material through which carrier ions can pass, and to be thin enough to allow carrier ions to pass through the coating film.

As a material for the coating film, silicon oxide that is an insulator is used. In particular, in one embodiment of the present invention, silicon oxide contains at least carbon (C) and fluorine (F) as main components in addition to silicon (Si) and oxygen (O). The coating film is denser than a conventional surface film formed on a surface of an active material due to a decomposition product of an electrolyte solution.

Thus, having carrier ion conductivity, the coating film 104 covering the active material 103 can transmit carrier ions, and a battery reaction of the active material 103 can occur. On the other hand, having an insulating property, the coating film 104 can inhibit the reaction between an electrolyte solution and the active material 103.

Note that in the case of using an active material whose volume is changed in charging and discharging, the shape of the coating film is preferably changed following a change in shape of the active material due to the change in volume. Therefore, the Young's modulus of the coating film is preferably less than or equal to 70 GPa.

Further, to increase the conductivity of the active material layer 102, a conductive additive may be included in the active material layer 102 in addition to the active material 103 and the binder.

The binder may contain a carboxyl group as a functional group to bind the active material, the conductive additive, and the current collector. Examples of the binder are resin materials such as polyvinylidene fluoride (PVdF), a vinylidene fluoride-hexafluoropropylene copolymer, a vinylidene fluoride-tetrafluoroethylene copolymer, styrene-butadiene copolymer rubber, polytetrafluoroethylene, polypropylene, polyethylene, and polyimide.

As the conductive additive, a material with a large specific surface is desirably used; for example, acetylene black (AB) is preferably used. Alternatively, a carbon material such as a carbon nanotube, graphene, or fullerene can be used.

Note that the active material layer 102 does not necessarily have to be formed on and in direct contact with the current collector 101. Between the current collector 101 and the active material layer 102, any of the following functional layers may be formed using a conductive material such as a metal: an adhesive layer for the purpose of improving adhesiveness between the current collector 101 and the active material layer 102, a planarization layer for reducing unevenness of the surface of the current collector 101, a heat dissipation layer for dissipating heat, and a stress relaxation layer for reducing stress on the current collector 101 or the active material layer 102.

Figure 2:
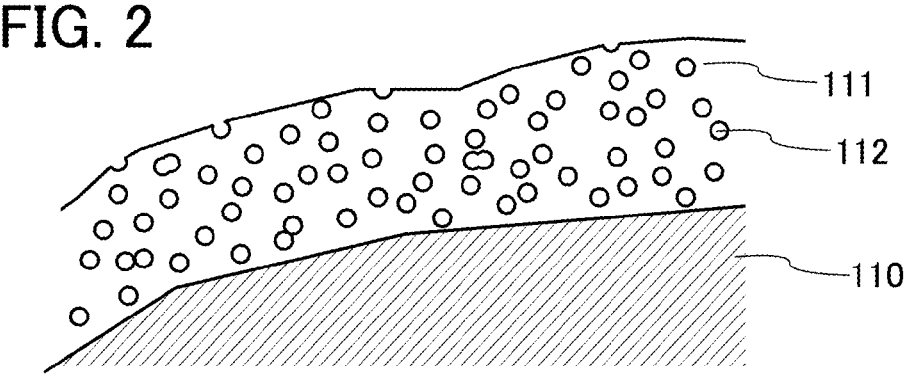
FIG. 2 illustrates a power storage device electrode.

FIG. 2 is a schematic view of a cross-section of a coating film 111 which is provided on an active material 110 and is different from that in FIG. 1C. Almost all of a plurality of pores 112 are not in contact with each other, which is different from the coating film 104 in FIG. 1C. Thus, there are hardly any pores each formed by a number of the pores 112 connected to each other and extending from the surface of the active material 110 to the surface of the coating film 111. For this reason, an electrolyte solution is not in contact with the active material 110 in a region where the coating film 111 is provided. This makes it possible to inhibit the generation of a surface film between the electrolyte solution and the active material.

As described above, by forming a coating film covering part of an active material on a surface of the active material, a battery reaction of the active material can occur and a decomposition reaction of an electrolyte solution can be inhibited.

This embodiment can be implemented combining with any of the other embodiments as appropriate.

Embodiment 2

In this embodiment, an example of a method for forming a power storage device electrode described in Embodiment 1 is described with reference to FIG. 3.

First, a binder containing a carboxyl group, an active material, and a solvent are combined and stirred to form a first mixture (Step S150).

The binder contains a carboxyl group as a functional group and at least binds the active material, a conductive additive, and a current collector. Examples of the binder are resin materials such as polyvinylidene fluoride (PVdF), a vinylidene fluoride-hexafluoropropylene copolymer, a vinylidene fluoride-tetrafluoroethylene copolymer, styrene-butadiene copolymer rubber, polytetrafluoroethylene, polypropylene, polyethylene, and polyimide.

The carboxyl group is contained in the binder at greater than or equal to 1 wt % and less than 10 wt %.

Next, a polysilazane solution is added to the obtained mixture to form a second mixture (Step S151).

At this time, the reaction between polysilazane and an —OH group in the carboxyl group contained in the binder is probably started.

The obtained second mixture is provided over the current collector (Step S152).

From Steps S150 to S152 are performed in a low humidity environment such as a dry room. This inhibits polysilazane from being hydrolyzed to be silicon oxide before the mixture is provided over the current collector. The dew point of the low humidity environment is lower than or equal to −20° C., preferably lower than or equal to −40° C.

Although not illustrated, after Step S152, the second mixture provided over the current collector may be dried in a low humidity environment such as a dry room. As the drying, ventilation drying may be performed. Heat treatment for the drying is performed at a temperature higher than or equal to 50° C. and lower than or equal to 200° C., preferably higher than or equal to 60° C. and lower than or equal to 150° C.

Then, the second mixture is baked through heat treatment. The polysilazane is hydrolyzed at the same time as the baking (Step S153). The current collector and the second mixture provided thereover are carried out of the dry room and Step S153 is performed in the air. With the use of moisture in the air, the hydrolysis of the polysilazane proceeds. The hydrolysis of the polysilazane is a reaction following Reaction Formula 1 described above. The heat treatment in Step S153 is performed at a temperature higher than or equal to 50° C. and lower than or equal to 200° C., preferably higher than or equal to 100° C. and lower than or equal to 180° C. For example, the heat treatment can be performed with a hot plate at 150° C.

The structure of polysilazane is changed into that of silicon oxide through Step S153. A gas of ammonium or the like generated in this step is released outside, so that a coating film to be formed has a spongy shape.

Then, in Step S154, drying is performed in a reduced pressure atmosphere, whereby a power storage device electrode including an active material covered with a coating film can be obtained. The drying is performed at a temperature higher than or equal to 100° C. and lower than or equal to 200° C., preferably higher than or equal to 140° C. and lower than or equal to 180° C. For example, vacuum drying may be performed at 170° C.

Although description of a step of rolling with a roller press machine or the like is omitted in Steps S150 to S154, the step of rolling may be performed as appropriate to increase the density of an active material layer.

Through the above steps, a power storage device electrode including an active material covered with a spongy coating film can be formed. In the case of forming a coating film on an active material with the use of polysilazane and a binder containing a carboxyl group in such a manner, the coating film can be formed without a complicated process; therefore, the method for forming the power storage device electrode of one embodiment of the present invention is suitable for a mass production process.

This embodiment can be implemented combining with any of the other embodiments as appropriate.

Embodiment 3

In this embodiment, a variety of power storage devices each using the power storage device electrode described in Embodiments 1 and 2 are described with reference to FIGS. 4A and 4B and FIGS. 5A and 5B.

(Coin-Type Secondary Battery)

Figure 4A:
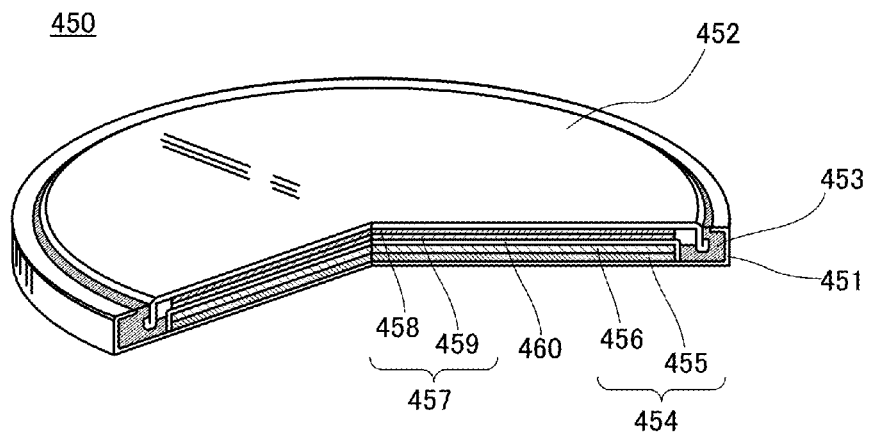
FIGS. 4A and 4B each illustrate a power storage device.

FIG. 4A is an external view of a coin-type (single-layer flat type) lithium-ion secondary battery, part of which illustrates a cross-sectional view of part of the coin-type lithium-ion secondary battery.

In a coin-type secondary battery 450, a positive electrode can 451 serving also as a positive electrode terminal and a negative electrode can 452 serving also as a negative electrode terminal are insulated and sealed with a gasket 453 formed of polypropylene or the like. A positive electrode 454 includes a positive electrode current collector 455 and a positive electrode active material layer 456 which is provided to be in contact with the positive electrode current collector 455. A negative electrode 457 is formed of a negative electrode current collector 458 and a negative electrode active material layer 459 which is provided to be in contact with the negative electrode current collector 458. A separator 460 and an electrolyte solution (not illustrated) are included between the positive electrode active material layer 456 and the negative electrode active material layer 459.

The power storage device electrode of one embodiment of the present invention is used as at least one of the positive electrode 454 and the negative electrode 457.

The negative electrode 457 includes the negative electrode current collector 458 and the negative electrode active material layer 459. The positive electrode 454 includes the positive electrode current collector 455 and the positive electrode active material layer 456.

As the separator 460, a porous insulator such as cellulose, polypropylene (PP), polyethylene (PE), polybutene, nylon, polyester, polysulfone, polyacrylonitrile, polyvinylidene fluoride, or tetrafluoroethylene can be used. Further, non-woven fabric of a glass fiber or the like, or a diaphragm in which a glass fiber and a polymer fiber are mixed may also be used.

As a solvent for the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

With the use of a gelled high-molecular material as the solvent for the electrolyte solution, safety against liquid leakage and the like is improved. Further, a secondary battery can be thinner and more lightweight. Typical examples of the gelled high-molecular material are a silicone gel, an acrylic gel, an acrylonitrile gel, polyethylene oxide, polypropylene oxide, and a fluorine-based polymer.

Alternatively, the use of one or more of ionic liquids (room temperature molten salts) which are less likely to burn and volatilize as the solvent for the electrolyte solution can prevent the secondary battery from exploding or catching fire even when the secondary battery internally shorts out or the internal temperature increases due to overcharging or the like.

As an electrolyte dissolved in the above-described solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

For the positive electrode can 451 and the negative electrode can 452, a metal having corrosion resistance to an electrolyte solution, such as nickel, aluminum, or titanium, an alloy of such a metal, or an alloy of such a metal and another metal (e.g., stainless steel) can be used. Alternatively, the positive electrode can 451 and the negative electrode can 452 are preferably coated with nickel, aluminum, or the like in order to prevent corrosion caused by the electrolyte solution. The positive electrode can 451 and the negative electrode can 452 are electrically connected to the positive electrode 454 and the negative electrode 457, respectively.

The negative electrode 457, the positive electrode 454, and the separator 460 are immersed in the electrolyte solution. Then, as illustrated in FIG. 4A, the positive electrode can 451, the positive electrode 454, the separator 460, the negative electrode 457, and the negative electrode can 452 are stacked in this order with the positive electrode can 451 positioned at the bottom, and the positive electrode can 451 and the negative electrode can 452 are subjected to pressure bonding with the gasket 453 provided therebetween. In such a manner, the coin-type secondary battery 450 is manufactured.

(Laminated Secondary Battery)

Figure 4B:
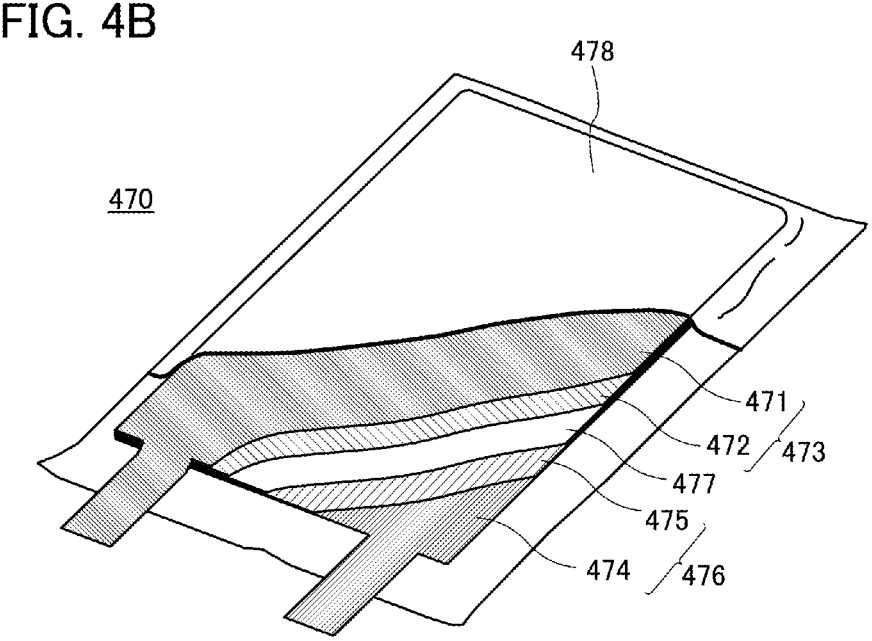

Next, an example of a laminated secondary battery is described with reference to FIG. 4B. In FIG. 4B, a structure inside the laminated secondary battery is partly exposed for convenience.

A laminated secondary battery 470 illustrated in FIG. 4B includes a positive electrode 473 including a positive electrode current collector 471 and a positive electrode active material layer 472, a negative electrode 476 including a negative electrode current collector 474 and a negative electrode active material layer 475, a separator 477, an electrolyte solution (not illustrated), and an exterior body 478. The separator 477 is placed between the positive electrode 473 and the negative electrode 476 provided in the exterior body 478. The exterior body 478 is filled with the electrolyte solution. Although the one positive electrode 473, the one negative electrode 476, and the one separator 477 are used in FIG. 4B, the secondary battery may have a stacked-layer structure in which positive electrodes, negative electrodes, and separators are alternately stacked.

The power storage device electrode of one embodiment of the present invention is used as at least one of the positive electrode 473 and the negative electrode 476.

For the electrolyte solution, an electrolyte and a solvent which are similar to those in the above-described coin-type secondary battery can be used.

In the laminated secondary battery 470 illustrated in FIG. 4B, the positive electrode current collector 471 and the negative electrode current collector 474 also serve as terminals (tabs) for an electrical contact with the outside. For this reason, the positive electrode current collector 471 and the negative electrode current collector 474 are provided so that part of the positive electrode current collector 471 and part of the negative electrode current collector 474 are exposed outside the exterior body 478.

As the exterior body 478 in the laminated secondary battery 470, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used. With such a three-layer structure, permeation of the electrolyte solution and a gas can be blocked and an insulating property and resistance to the electrolyte solution can be obtained.

(Cylindrical Secondary Battery)

Figure 5A:
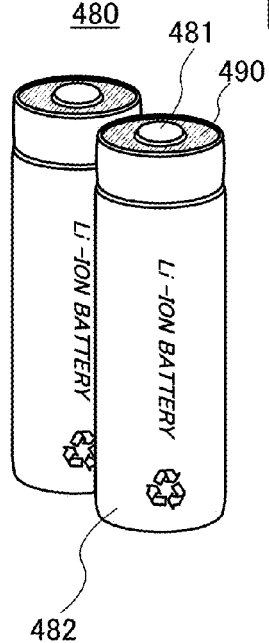
FIGS. 5A and 5B illustrate a power storage device.

Next, examples of a cylindrical secondary battery are described with reference to FIGS. 5A and 5B. As illustrated in FIG. 5A, a cylindrical secondary battery 480 includes a positive electrode cap (battery cap) 481 on its top surface and a battery can (outer can) 482 on its side surface and bottom surface. The positive electrode cap 481 and the battery can 482 are insulated from each other with a gasket (insulating packing) 490.

Figure 5B:
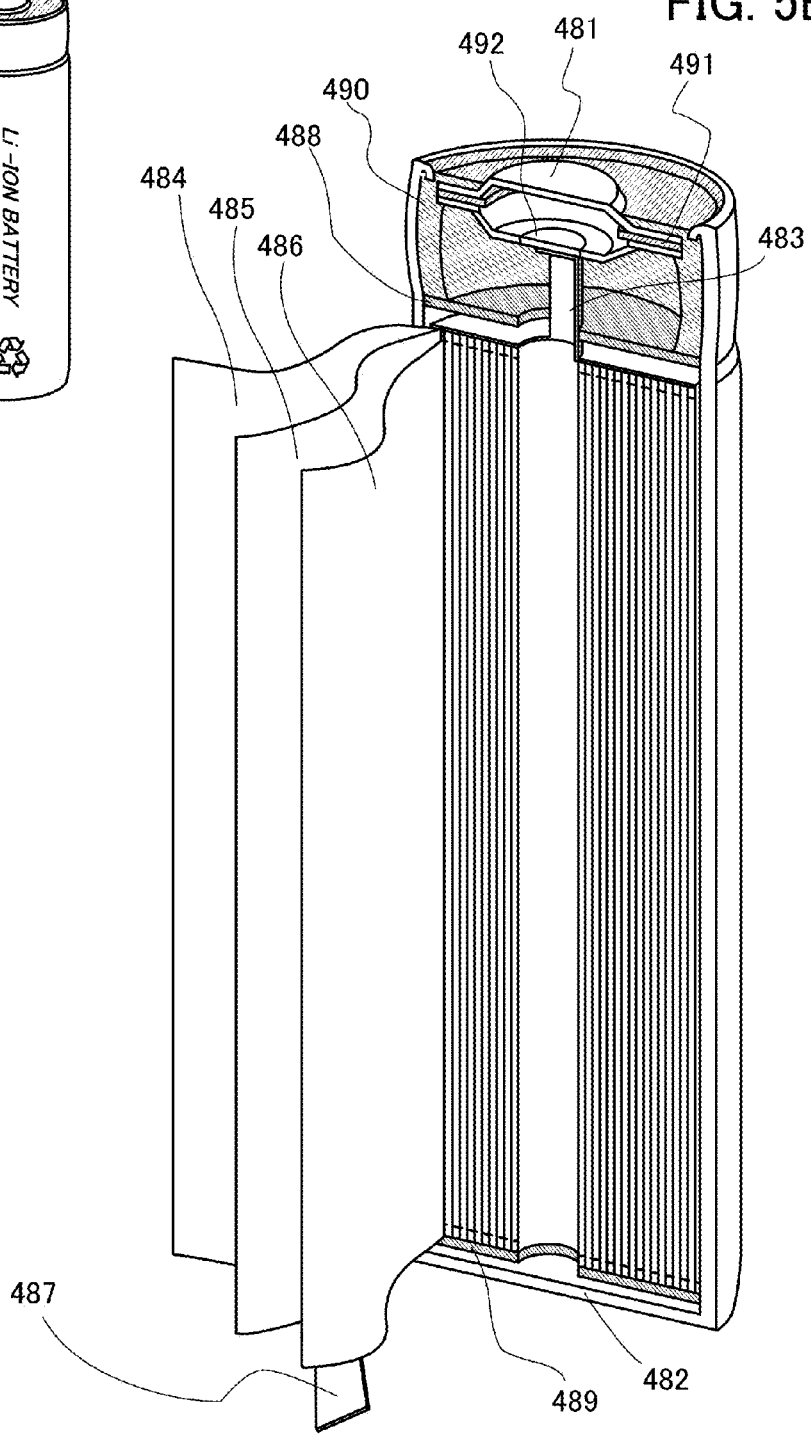

FIG. 5B is a diagram schematically illustrating a cross-section of the cylindrical secondary battery. In the battery can 482 with a hollow cylindrical shape, a battery element is provided in which a strip-like positive electrode 484 and a strip-like negative electrode 486 are wound with a separator 485 provided therebetween. Although not illustrated, the battery element is wound around a center pin as a center. One end of the battery can 482 is close and the other end thereof is open.

The power storage device electrode of one embodiment of the present invention is used as at least one of the positive electrode 484 and the negative electrode 486.

For the battery can 482, a metal having corrosion resistance to an electrolyte solution, such as nickel, aluminum, or titanium, an alloy of such a metal, or an alloy of such a metal and another metal (e.g., stainless steel) can be used. Alternatively, the battery can 482 is preferably coated with nickel, aluminum, or the like in order to prevent corrosion caused by the electrolyte solution. Inside the battery can 482, the battery element in which the positive electrode, the negative electrode, and the separator are wound is provided between a pair of insulating plates 488 and 489 which face each other.

An electrolyte solution (not illustrated) is injected inside the battery can 482 in which the battery element is provided. For the electrolyte solution, an electrolyte and a solvent which are similar to those in the above-described coin-type secondary battery or laminated secondary battery can be used.

Since the positive electrode 484 and the negative electrode 486 of the cylindrical secondary battery are wound, active materials are formed on both sides of the current collectors. A positive electrode terminal (positive electrode current collecting lead) 483 is connected to the positive electrode 484, and a negative electrode terminal (negative electrode current collecting lead) 487 is connected to the negative electrode 486. A metal material such as aluminum can be used for both the positive electrode terminal 483 and the negative electrode terminal 487. The positive electrode terminal 483 and the negative electrode terminal 487 are resistance-welded to a safety valve mechanism 492 and the bottom of the battery can 482, respectively. The safety valve mechanism 492 is electrically connected to the positive electrode cap 481 through a positive temperature coefficient (PTC) element 491. In the case where an internal pressure of the battery is increased to exceed a predetermined threshold value, the safety valve mechanism 492 electrically disconnects the positive electrode cap 481 and the positive electrode 484. The PTC element 491 is a heat sensitive resistor whose resistance increases as temperature rises, and controls the amount of current by an increase in resistance to prevent unusual heat generation. Note that barium titanate ($BaTiO_3$)-based semiconductor ceramic or the like can be used for the PTC element.

Note that in this embodiment, the coin-type secondary battery, the laminated secondary battery, and the cylindrical secondary battery are given as examples of the secondary battery; however, any of secondary batteries with a variety of shapes, such as a sealed secondary battery and a square-type secondary battery, can be used. Further, a structure in which a plurality of positive electrodes, a plurality of negative electrodes, and a plurality of separators are stacked or wound may be employed.

This embodiment can be implemented combining with any of the other embodiments as appropriate.

Embodiment 4

In this embodiment, a lithium ion capacitor is described as a power storage device.

The lithium ion capacitor is a hybrid capacitor which combines a positive electrode of an electric double layer capacitor (EDLC) and a negative electrode of a lithium-ion secondary battery using a carbon material, and also an asymmetric capacitor in which the principles of power storage are different between the positive electrode and the negative electrode. The positive electrode forms an electrical double layer and enables charge and discharge by a physical action, whereas the negative electrode enables charge and discharge by a chemical action of lithium. With the use of a negative electrode in which lithium is occluded in advance as the carbon material or the like that is a negative electrode active material, the lithium ion capacitor can have energy density dramatically higher than that of a conventional electrical double layer capacitor including a negative electrode using active carbon.

In a lithium-ion capacitor, instead of a positive electrode active material layer in a lithium-ion secondary battery, a material that can reversibly adsorb at least one of lithium ions and anions is used. Examples of such a material are active carbon, a conductive high molecule, and a polyacenic semiconductor (PAS).

The lithium ion capacitor has high efficiency of charge and discharge, capability of rapidly performing charge and discharge, and a long life even when it is repeatedly used.

As a negative electrode active material of such a lithium-ion capacitor, the power storage device electrode of one embodiment of the present invention is used. Thus, irreversible capacity generated in initial charge and discharge is reduced, so that a power storage device having improved cycle performance can be manufactured. Further, a power storage device having excellent high temperature characteristics can be manufactured.

This embodiment can be implemented combining with any of the other embodiments as appropriate.

Embodiment 5

The power storage device of one embodiment of the present invention can be used for power sources of a variety of electrical devices. Here, "electrical devices" refer to all general industrial products including portions which operate by electric power. Electrical devices are not limited to consumer products such as home electrical products and also include products for various uses such as business use, industrial use, and military use in their category.

Examples of electrical devices each using the power storage device of one embodiment of the present invention are as follows: display devices of televisions, monitors, and the like, lighting devices, desktop personal computers, laptop personal computers, word processors, image reproduction devices which reproduce still images or moving images stored in recording media such as digital versatile discs (DVDs), portable or stationary music reproduction devices such as compact disc (CD) players and digital audio players, portable or stationary radio receivers, recording reproduction devices such as tape recorders and IC recorders (voice recorders), headphone stereos, stereos, remote controls, clocks such as table clocks and wall clocks, cordless phone handsets, transceivers, mobile phones, car phones, portable or stationary game machines, pedometers, calculators, portable information terminals, electronic notebooks, e-book readers, electronic translators, audio input devices such as microphones, cameras such as still cameras and video cameras, toys, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, smoke detectors, and a health equipment and a medical equipment such as hearing aids, cardiac pacemakers, portable X-ray equipments, radiation counters, electric massagers, and dialyzers. The examples also include industrial equipment such as guide lights, traffic lights, meters such as gas meters and water meters, belt conveyors, elevators, escalators, automatic vending machines, automatic ticket machine, cash dispensers (CD), automated teller machines (ATM), industrial robots, radio relay stations, mobile phone base stations, power storage systems, and power storage devices for leveling the amount of power supply and smart grid. In addition, moving objects (transporters) driven by an electric motor using electric power from a power storage device are also included in the category of the electrical devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, agricultural machines, motorized bicycles including motor-assisted bicycles, motorcycles, electric wheelchairs, electric carts, boats or ships, submarines, aircrafts such as fixed-wing aircraft and rotary-wing aircraft, rockets, artificial satellites, space probes, planetary probes, and spacecrafts.

In the electrical devices, the power storage device of one embodiment of the present invention can be used as a main power source for supplying enough electric power for almost the whole power consumption. Alternatively, in the above electrical devices, the power storage device of one embodiment of the present invention can be used as an uninterruptible power source which can supply power to the electrical devices when the supply of power from the main power source or a commercial power source is stopped. Still alternatively, in the electrical devices, the power storage device of one embodiment of the present invention can be used as an auxiliary power source for supplying electric power to the electrical devices at the same time as the power supply from the main power source or a commercial power source.

The electrical devices may each include a power storage device or may be connected wirelessly or with a wiring to one or more of power storage devices and a control device controlling these devices to form a network (electric power network). The network controlled by the control device can improve efficiency in the use of electric power in the whole network.

FIG. 6A illustrates an example of a home energy management system (HEMS) in which a plurality of home appliances, a control device, a power storage device, and the like are connected in a house. Such a system makes it possible to check easily the power consumption of the whole house. In addition, the plurality of home appliances can be operated with a remote control. In the case of automatically controlling the home appliances with a sensor or the control device, the power consumption can be reduced.

A distribution board 503 set in a house 500 is connected to an electric power system 501 through a service wire 502. The distribution board 503 supplies AC power which is electric power supplied from a commercial power source through the service wire 502 to each of the plurality of home appliances. A control device 504 is connected to the distribution board 503 and also connected to the plurality of home appliances, a power storage system 505, a solar power generation system 506, and the like. Further, the control device 504 can also be connected to an electric vehicle 512 which is parked outside the house 500 or the like and operates independently from the distribution board 503.

The control device 504 connects the distribution board 503 to the plurality of home appliances to form a network, and controls the operation of the plurality of home appliances connected to the network.

In addition, the control device 504 is connected to Internet 511 and thus can be connected to a management server 513 through the Internet 511. The management server 513 receives data on status of use of electric power by users and therefore can create a database and can provide the users with a variety of services based on the database. Further, as needed, the management server 513 can provide the users with data on electric power charge for a corresponding time zone, for example. On the basis of the data, the control device 504 can set an optimized usage pattern in the house 500.

Examples of the plurality of home appliances are a display device 507, a lighting device 508, an air-conditioning system 509, and an electric refrigerator 510 which are illustrated in FIG. 6A. However, it is needless to say that the plurality of home appliances are not limited to these examples, and refer to a variety of electrical devices which can be set inside a house, such as the above-described electrical devices.

In a display portion of the display device 507, a semiconductor display device such as a liquid crystal display device, a light-emitting device including a light-emitting element, e.g., an organic EL element, in each pixel, an electrophoretic display device, a digital micromirror device (DMD), a plasma display panel (PDP), or a field emission display (FED) is provided, for example. A display device functioning as a display device for displaying information, such as a display device for TV broadcast reception, a personal computer, advertisement, or the like, is included in the category of the display device 507.

The lighting device 508 includes an artificial light source which generates light artificially by utilizing electric power in its category. Examples of the artificial light source are an incandescent lamp, a discharge lamp such as a fluorescent lamp, and a light-emitting element such as LED and an organic EL element. Although being provided on a ceiling in FIG. 6A, the lighting device 508 may be installation lighting provided on a wall, a floor, a window, or the like or desktop lighting.

The air-conditioning system 509 has a function of adjusting an indoor environment such as temperature, humidity, and air cleanliness. FIG. 6A illustrates an air conditioner as an example. The air conditioner includes an indoor unit in which a compressor, an evaporator, and the like are integrated and an outdoor unit (not illustrated) in which a condenser is incorporated, or an integral unit thereof.

The electric refrigerator 510 is an electrical device for the storage of food and the like at low temperature and includes a freezer for freezing at 0° C. or lower. A refrigerant in a pipe which is compressed by a compressor absorbs heat when vaporized, and thus inside the electric refrigerator 510 is cooled.

The plurality of home appliances may each include a power storage device or may use electric power supplied from the power storage system 505 or the commercial power source without including the power storage device. By using a power storage device as an uninterruptible power source, the plurality of home appliances each including the power storage device can be used even when electric power cannot be supplied from the commercial power source due to power failure or the like.

In the vicinity of a terminal for power supply in each of the above-described home appliances, an electric power sensor such as a current sensor can be provided. Data obtained with the electric power sensor is send to the control device 504, which makes it possible for the users to check the used amount of electric power of the whole house. In addition, on the basis of the data, the control device 504 can determine the distribution of electric power supplied to the plurality of home appliances, resulting in the efficient or economical use of electric power in the house 500.

In a time zone when the usage rate of electric power which can be supplied from the commercial power source is low, the power storage system 505 can be charged with electric power from the commercial power source. Further, with the use of the solar power generation system 506, the power storage system 505 can be charged during the daytime. Note that an object to be charged is not limited to the power storage system 505, and a power storage device included in the electric vehicle 512 and the power storage devices included in the plurality of home appliances which are connected to the control device 504 may each be the object to be charged.

Electric power stored in a variety of power storage devices in such a manner is efficiently distributed by the control device 504, resulting in the efficient or economical use of electric power in the house 500.

As an example of controlling a network of a plurality of electrical devices, one or more of power storage devices, and a control device which controls these devices, the example of controlling an electric power network on a house scale is described above; however, the scale of the electric power network is not limited thereto. An electric power network on an urban scale or a national scale (also referred to as a smart grid) can be created by a combination of a control device such as a smart meter and a communication network. Further, a microgrid which is on a scale of a factory or an office and includes an energy supply source and a plant consuming electric power as units can be constructed.

This embodiment can be implemented combining with any of the other embodiments as appropriate.

Embodiment 6

Next, as an example of the electrical devices, a moving object is described with reference to FIGS. 6B and 6C.

The power storage device of one embodiment of the present invention, which is described in the above embodiment, can be used as a power storage device for controlling the moving object.

FIG. 6B illustrates an example of a structure inside an electric vehicle. An electric vehicle 560 includes a power storage device 564 that can be charged and discharged. Output of electric power of the power storage device 564 is adjusted by an electronic control unit (ECU) 565 so that the electric power is supplied to a drive motor unit 567 through an inverter unit 566. The inverter unit 566 can convert DC power input from the power storage device 564 into three phase AC power, can adjust the voltage, current, and frequency of the converted AC power, and can output the AC power to the drive motor unit 567.

Thus, when a driver presses an accelerator pedal (not illustrated), the drive motor unit 567 works, so that torque generated in the drive motor unit 567 is transferred to rear wheels (drive wheels) 570 through an output shaft 568 and a drive shaft 569. Front wheels 563 are operated following the rear wheels 570, whereby the electric vehicle 560 can be driven.

Sensors such as a voltage sensor, a current sensor, and a temperature sensor are provided in each of the units to monitor physical values of each part of the electric vehicle 560, as appropriate.

The electronic control unit 565 is a processing device including a memory such as a RAM or a ROM, and a CPU, which are not illustrated. The electronic control unit 565 outputs a control signal to the inverter unit 566, the drive motor unit 567, or the power storage device 564 on the basis of operational information of the electric vehicle 560 (e.g., acceleration, deceleration, or a stop), temperature information of a driving environment or each unit, control information, or input data on the state of charge (SOC) of the power storage device or the like. Various data and programs are stored in the memory.

The drive motor unit 567 can be used in combination with any of an AC motor, a DC motor, and an internal-combustion engine.

Note that it is needless to say that one embodiment of the present invention is not limited to the moving object described above as long as the power storage device of one embodiment of the present invention is included.

The power storage device 564 included in the electric vehicle 560 can be charged by being supplied with electric power through an external charging facility by a plug-in system, a contactless power supply system, or the like. FIG. 6C illustrates the state where the power storage device 564 included in the electric vehicle 560 is charged with the use of a ground-based charging apparatus 561 through a cable 562. In charging, a given method such as CHAdeMO (registered trademark) may be referred to for a charging method, the standard of a connector, or the like as appropriate. The charging apparatus 561 may be a charging station provided in a commerce facility or a power source in a house. For example, with the use of a plug-in technique in which a connecting plug 571 illustrated in FIG. 6B and connected to the power storage device 564 is electrically connected to the charging apparatus 561, the power storage device 564 included in the electric vehicle 560 can be charged by being supplied with electric power from outside. The power storage device 564 can be charged by converting external power into DC constant voltage having a predetermined voltage level through a converter such as an AC-DC converter.

Further, although not illustrated, a power receiving device may be included in the moving object to charge the power storage device by supplying electric power from an aboveground power transmitting device in a non-contact manner. In the case of the contactless power supply system, by fitting the power transmitting device in a road or an exterior wall, charging can be performed not only when the electric vehicle is stopped but also when driven. In addition, the contactless power supply system may be utilized to perform transmission/reception between moving objects. Furthermore, a solar cell may be provided in an exterior of the moving object to charge the power storage device 564 when the electric vehicle is stopped or driven.

Note that in the case where the moving object is an electric railway vehicle, a power storage device included therein can be charged by being supplied with electric power from an overhead cable or a conductor rail.

With the use of the power storage device of one embodiment of the present invention as the power storage device 564, the power storage device 564 can have favorable cycle characteristics and improved convenience. When the power storage device 564 itself can be more compact and more lightweight as a result of improved characteristics of the power storage device 564, the electric vehicle can be lightweight and fuel efficiency can be increased. Further, the power storage device 564 included in the moving object has relatively large capacity; therefore, the power storage device 564 can be used as an electric power supply source for indoor use, for example. In such a case, the use of a commercial power source can be avoided at peak time of electric power demand.

This embodiment can be implemented combining with any of the other embodiments as appropriate.

Embodiment 7

Next, as another example of the electrical devices, a portable information terminal is described with reference to FIGS. 7A to 7C.

Figure 7A:
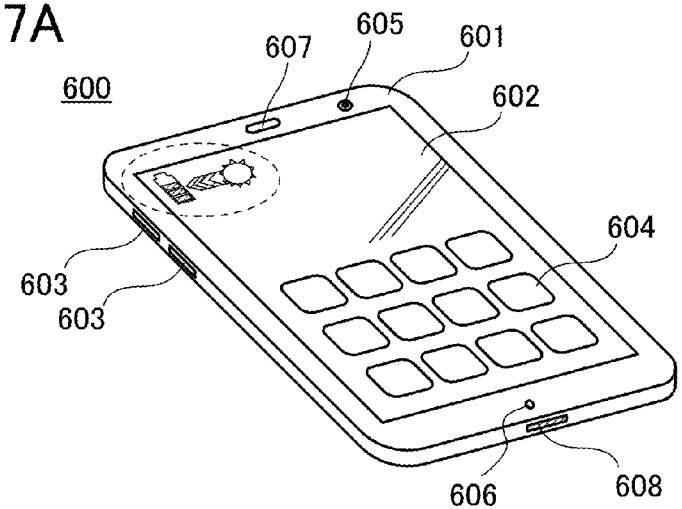
FIGS. 7A to 7C illustrate an electrical device.

FIG. 7A is a perspective view illustrating a front surface and a side surface of a portable information terminal 600. The portable information terminal 600 is capable of executing a variety of applications such as mobile phone calls, e-mailing, viewing and editing texts, music reproduction, Internet communication, and a computer game. In the portable information terminal 600, a housing 601 includes a display portion 602, a camera lens 605, a microphone 606, and a speaker 607 on its front surface, a button 603 for operation on its left side, and a connection terminal 608 on its bottom surface.

A display module or a display panel is used for the display portion 602. Examples of the display module or the display panel are a light-emitting device in which each pixel includes a light-emitting element typified by an organic light-emitting element (OLED); a liquid crystal display device; an electronic paper performing a display in an electrophoretic mode, an electronic liquid powder (registered trademark) mode, or the like; a digital micromirror device (DMD); a plasma display panel (PDP); a field emission display (FED); a surface conduction electron-emitter display (SED); a light-emitting diode (LED) display; a carbon nanotube display; a nanocrystal display; and a quantum dot display.

The portable information terminal 600 illustrated in FIG. 7A is an example of providing the one display portion 602 in the housing 601; however, one embodiment of the present invention is not limited to this example. The display portion 602 may be provided on a rear surface of the portable information terminal 600. Further, the portable information terminal 600 may be a foldable portable information terminal in which two or more display portions are provided.

A touch panel with which data can be input by an instruction means such as a finger or a stylus is provided as an input means on the display portion 602. Thus, icons 604 displayed on the display portion 602 can be easily operated by the instruction means. Since the touch panel is provided, a region for a keyboard on the portable information terminal 600 is not needed and thus the display portion can be provided in a large region. Further, since data can be input with a finger or a stylus, a user-friendly interface can be obtained. Although the touch panel may be of any of various types such as a resistive type, a capacitive type, an infrared ray type, an electromagnetic induction type, and a surface acoustic wave type, the resistive type or the capacitive type is particularly preferable because the display portion 602 of one embodiment of the present invention can be curved. Furthermore, such a touch panel may be what is called an in-cell touch panel, in which a touch panel is integrated with the display module or the display panel.

The touch panel may also function as an image sensor. In this case, for example, an image of a palm print, a fingerprint, or the like is taken with the display portion 602 touched with the palm or the finger, whereby personal authentication can be performed. Furthermore, with the use of backlight or a sensing light source emitting near-infrared light for the display portion 602, an image of a finger vein, a palm vein, or the like can also be taken.

Further, instead of the touch panel, a keyboard may be provided in the display portion 602. Furthermore, both the touch panel and the keyboard may be provided.

The button 603 for operation can have various functions in accordance with the intended use. For example, the button 603 may be used as a home button so that a home screen is displayed on the display portion 602 by pressing the button 603. Further, the portable information terminal 600 may be configured such that main power source thereof is turned off with a press of the button 603 for a predetermined time. A structure may also be employed in which a press of the button 603 brings the portable information terminal 600 which is in a sleep mode out of the sleep mode. Besides, the button can be used as a switch for starting a variety of functions, for example, depending on the length of time for pressing or by pressing the button at the same time as another button.

Further, the button 603 may be used as a volume control button or a mute button to have a function of adjusting the volume of the speaker 607 for outputting sound, for example. The speaker 607 outputs various kinds of sound, examples of which are sound set for predetermined processing such as startup sound of an operating system (OS), sound from sound files executed in various applications, such as music from music reproduction application software, and an incoming e-mail alert. Although not illustrated, a connector for outputting sound to a device such as headphones, earphones, or a headset may be provided together with or instead of the speaker 607 for outputting sound.

As described above, the button 603 can have various functions. Although the number of the button 603 is two in the portable information terminal 600 in FIG. 7A, it is needless to say that the number, arrangement, position, or the like of the buttons is not limited to this example and can be designed as appropriate.

The microphone 606 can be used for sound input and recording. Images obtained with the use of the camera lens 605 can be displayed on the display portion 602.

In addition to the operation with the touch panel provided on the display portion 602 or the button 603, the portable information terminal 600 can be operated by recognition of user's movement (gesture) (also referred to as gesture input) using the camera lens 605, a sensor provided in the portable information terminal 600, or the like. Alternatively, with the use of the microphone 606, the portable information terminal 600 can be operated by recognition of user's voice (also referred to as voice input). By introducing a natural user interface (NUI) technique which enables data to be input to an electrical device by natural behavior of a human, the operational performance of the portable information terminal 600 can be further improved.

The connection terminal 608 is a terminal for inputting a signal at the time of communication with an external device or inputting electric power at the time of power supply. For example, the connection terminal 608 can be used for connecting an external memory drive to the portable information terminal 600. Examples of the external memory drive are storage medium drives such as an external hard disk drive (HDD), a flash memory drive, a digital versatile disk (DVD) drive, a DVD-recordable (DVD-R) drive, a DVD-rewritable (DVD-RW) drive, a compact disc (CD) drive, a compact disc recordable (CD-R) drive, a compact disc rewritable (CD-RW) drive, a magneto-optical (MO) disc drive, a floppy disk drive (FDD), and a nonvolatile solid state drive (SSD) device different from the above. Although the portable information terminal 600 has the touch panel on the display portion 602, a keyboard may be provided on the housing 601 instead of the touch panel or may be externally added.

Although the number of the connection terminal 608 is one in the portable information terminal 600 in FIG. 7A, it is needless to say that the number, arrangement, position, or the like of the connection terminals is not limited to this example and can be designed as appropriate.

Figure 7B:
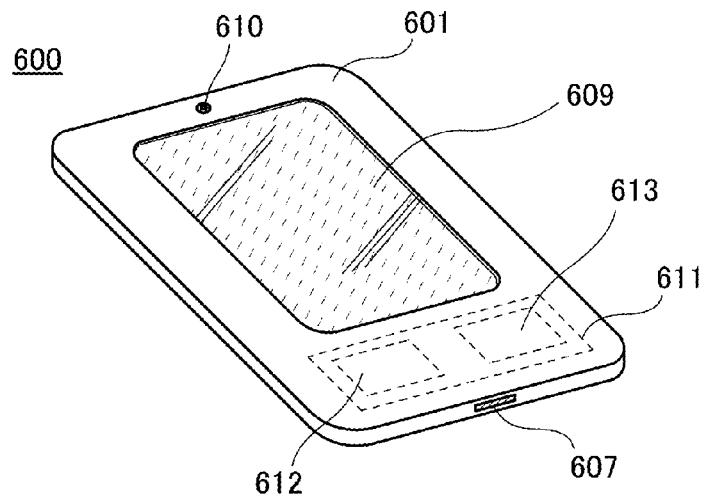

FIG. 7B is a perspective view illustrating the rear surface and the side surface of the portable information terminal 600. In the portable information terminal 600, the housing 601 includes a solar cell 609 and a camera lens 610 on its rear surface; the portable information terminal 600 further includes a charge and discharge control circuit 611, a power storage device 612, a DC-DC converter 613, and the like. FIG. 7B illustrates an example where the charge and discharge control circuit 611 includes the power storage device 612 and the DC-DC converter 613. The power storage device of one embodiment of the present invention, which is described in the above embodiment, is used as the power storage device 612.

The solar cell 609 attached on the rear surface of the portable information terminal 600 can supply power to the display portion, the touch panel, a video signal processor, and the like. Note that the solar cell 609 can be provided on one or both surfaces of the housing 601. By including the solar cell 609 in the portable information terminal 600, the power storage device 612 in the portable information terminal 600 can be charged even in a place where an electric power supply unit is not provided, such as outdoors.

As the solar cell 609, it is possible to use any of the following: a silicon-based solar cell including a single layer or a stacked layer of single crystal silicon, polycrystalline silicon, microcrystalline silicon, or amorphous silicon; an InGaAs-based, GaAs-based, CIS-based, $Cu_2ZnSnS_4$-based, or CdTe—CdS-based solar cell; a dye-sensitized solar cell including an organic dye; an organic thin film solar cell including a conductive polymer, fullerene, or the like; a quantum dot solar cell having a pin structure in which a quantum dot structure is formed in an i-layer with silicon or the like; and the like.

Here, an example of a structure and operation of the charge and discharge control circuit 611 illustrated in FIG. 7B is described with reference to a block diagram in FIG. 7C.

Figure 7C:
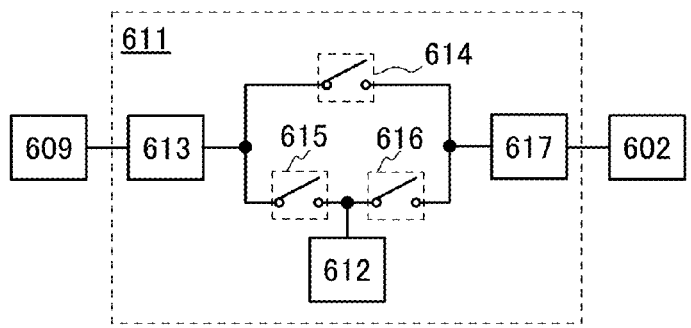

FIG. 7C illustrates the solar cell 609, the power storage device 612, the DC-DC converter 613, a converter 617, a switch 614, a switch 615, a switch 616, and the display portion 602. The power storage device 612, the DC-DC converter 613, the converter 617, and the switches 614 to 616 correspond to the charge and discharge control circuit 611 in FIG. 7B.

The voltage of electric power generated by the solar cell 609 with the use of external light is raised or lowered by the DC-DC converter 613 to be at a level needed for charging the power storage device 612. When electric power from the solar cell 609 is used for the operation of the display portion 602, the switch 614 is turned on and the voltage of the electric power is raised or lowered by the converter 617 to a voltage needed for operating the display portion 602. In addition, when display on the display portion 602 is not performed, the switch 614 is turned off and the switch 615 is turned on so that the power storage device 612 may be charged.

Although the solar cell 609 is described as an example of a power generation means, the power generation means is not particularly limited thereto, and the power storage device 612 may be charged by another power generation means such as a piezoelectric element or a thermoelectric conversion element (Peltier element). The charging method of the power storage device 612 in the portable information terminal 600 is not limited thereto, and the connection terminal 608 may be connected to a power source to perform charge, for example. The power storage device 612 may be charged by a non-contact power transmission module performing charge by transmitting and receiving power wirelessly (without contact), or any of the above charging methods may be used in combination.

Here, the state of charge (SOC) of the power storage device 612 is displayed on the upper left corner (in the dashed frame in FIG. 7A) of the display portion 602. Thus, the user can check the state of charge of the power storage device 612 and can accordingly select a power saving mode of the portable information terminal 600. When the user selects the power saving mode, for example, the button 603 or the icons 604 can be operated to switch the components of the portable information terminal 600, e.g., the display module or the display panel, an arithmetic unit such as CPU, and a memory, to the power saving mode. Specifically, in each of the components, the use frequency of a given function is decreased to stop the use. Further, the portable information terminal 600 can be configured to be automatically switched to the power saving mode depending on the state of charge. Furthermore, by providing a sensor such as an optical sensor in the portable information terminal 600, the amount of external light at the time of using the portable information terminal 600 is sensed to optimize display luminance, which makes it possible to regulate the power consumption of the power storage device 612.

In addition, when charging with the use of the solar cell 609 or the like is performed, an image or the like showing that the charging is performed with the solar cell may be displayed on the upper left corner (in the dashed frame) of the display portion 602 as illustrated in FIG. 7A.

It is needless to say that one embodiment of the present invention is not limited to the electrical device illustrated in FIGS. 7A to 7C as long as the power storage device of one embodiment of the present invention, which is described in the above embodiment, is included.

This embodiment can be implemented combining with any of the other embodiments as appropriate.

Example 1

As an example, the power storage device electrode of one embodiment of the present invention was formed and the characteristics thereof were measured.
(Formation of Electrode A)

First, as described in Embodiment 2, slurry was prepared to form an electrode. Graphite particles with an average diameter of 9 μm were added to N-methyl-2-pyrrolidone (NMP) including 8 wt % polyvinylidene fluoride (PVdF), and the mixture was stirred in a mixer at 2000 rpm for 10 minutes. The amount of the graphite particles was 2 g, and the amount of the NMP solution including 8 wt % PVdF was 2.78 g. A carboxyl group was contained in the PVdF. Then, a perhydropolysilazane solution was dropped to the mixture. The mixture was stirred in the mixer at 2000 rpm for 10 minutes three times. In the slurry, exclusive of the NMP, the graphite particles, the PVdF, and silicon oxide were mixed in a weight ratio of 88:9.8:2.2. The slurry was formed in a dry room to prevent entry of moisture.

The slurry formed in such a manner was applied over copper foil serving as a current collector at a rate of 10 mm/sec with a blade coating apparatus. The current collector to which the slurry was applied was dried by ventilation drying at 70° C. for 20 minutes to evaporate a polar solvent. The application step and the drying step were performed in the dry room, as in the case of the step of forming the slurry. When the current collector to which the slurry was applied is carried out of the dry room during the steps, perhydropolysilazane reacts with moisture in the air, so that the slurry is foamed due to the generation of $NH_3$ and $H_2$. Therefore, the above steps are preferably performed in a dry room or an environment equivalent to the dry room.

Next, baking was performed in the air at 150° C. for 1 hour in a draft chamber with a hot plate to form a coating film on the active material. Through the step, the electrode was baked and hydrolysis of the perhydropolysilazane proceeded to form silicon oxide. Here, also —OH in the carboxyl group contained in the PVdF reacted with the perhydropolysilazane to generate $NH_3$ and $H_2$. Note that the reaction between the perhydropolysilazane and the —OH in the carboxyl group contained in the PVdF probably started in the step for forming the slurry in which the PVdF and the perhydropolysilazane were mixed at room temperature. Through the step for forming the slurry at room temperature and the step for baking the slurry in the air at 150° C. for 1 hour, the coating film covering the surface of the active material became spongy silicon oxide having a plurality of pores. Moreover, the silicon oxide contains C and F as its main components in addition to Si and O by the reaction with the PVdF.

Next, heating was performed in a reduced pressure atmosphere at 170° C. for 10 hours to dry the electrode. The electrode was pressed to compress an active material layer, and then was stamped out to form a negative electrode for a power storage device. Hereinafter the negative electrode for a power storage device is referred to as Electrode A. In Electrode A, the proportion of the coating film in the active material layer is 2.5 wt %.
(Observation of Active Material Layer in Electrode A)

Figure 8A:
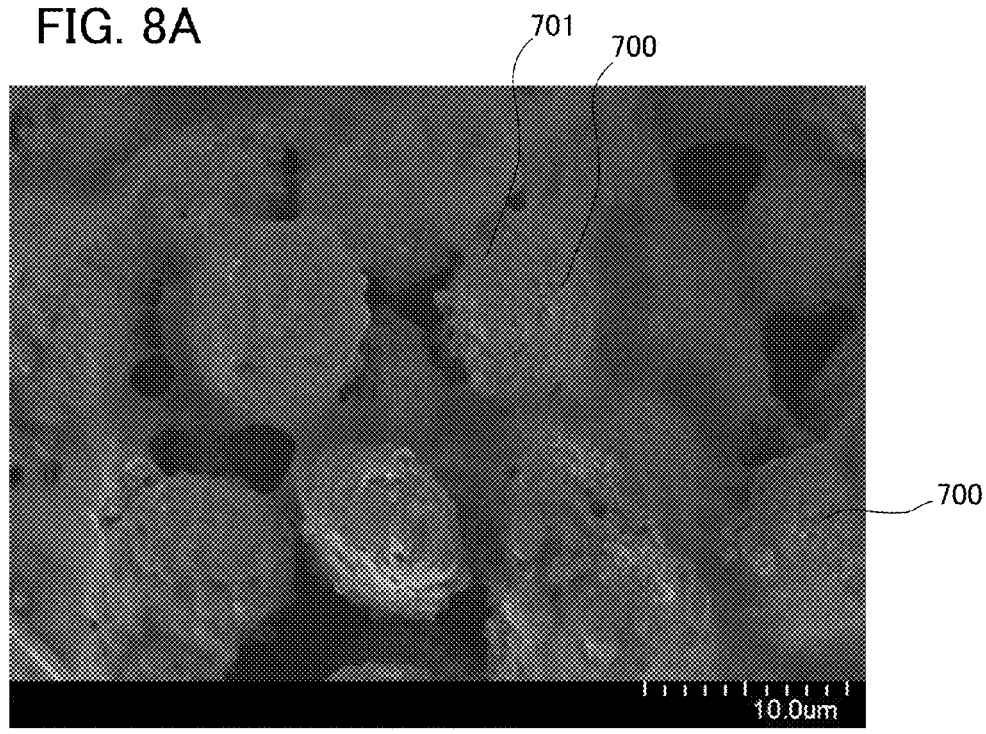
FIGS. 8A and 8B are SEM images of an active material layer.
Figure 8B:
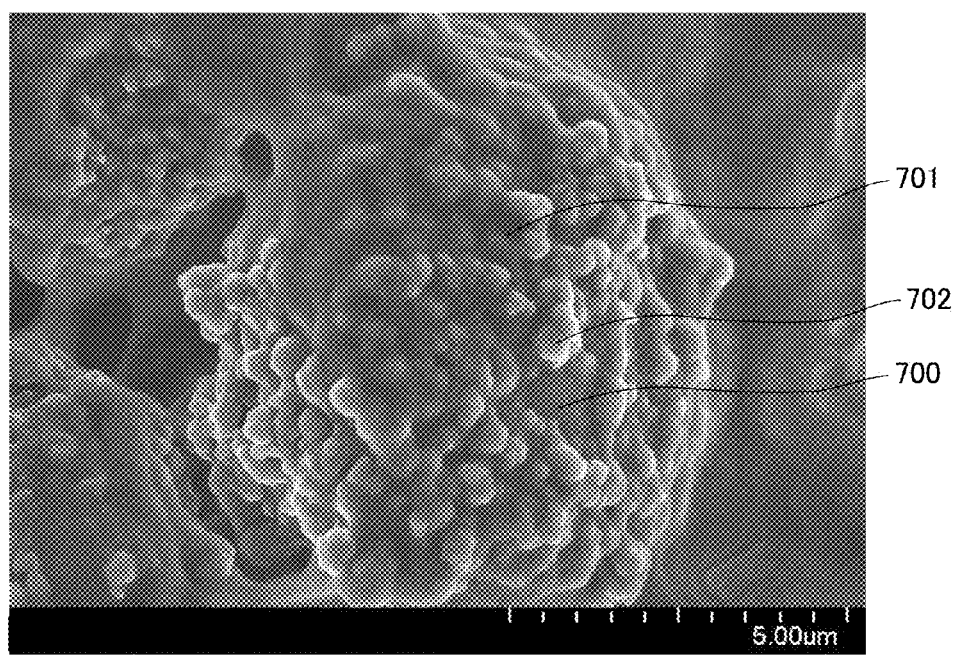
Figure 9A:
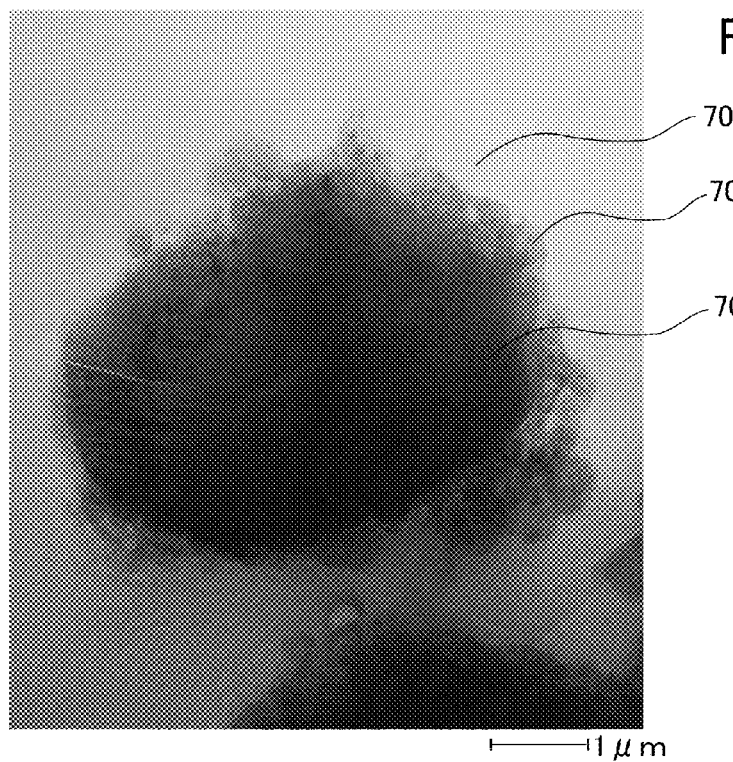
FIGS. 9A and 9B are TEM images of an active material layer.
Figure 9B:
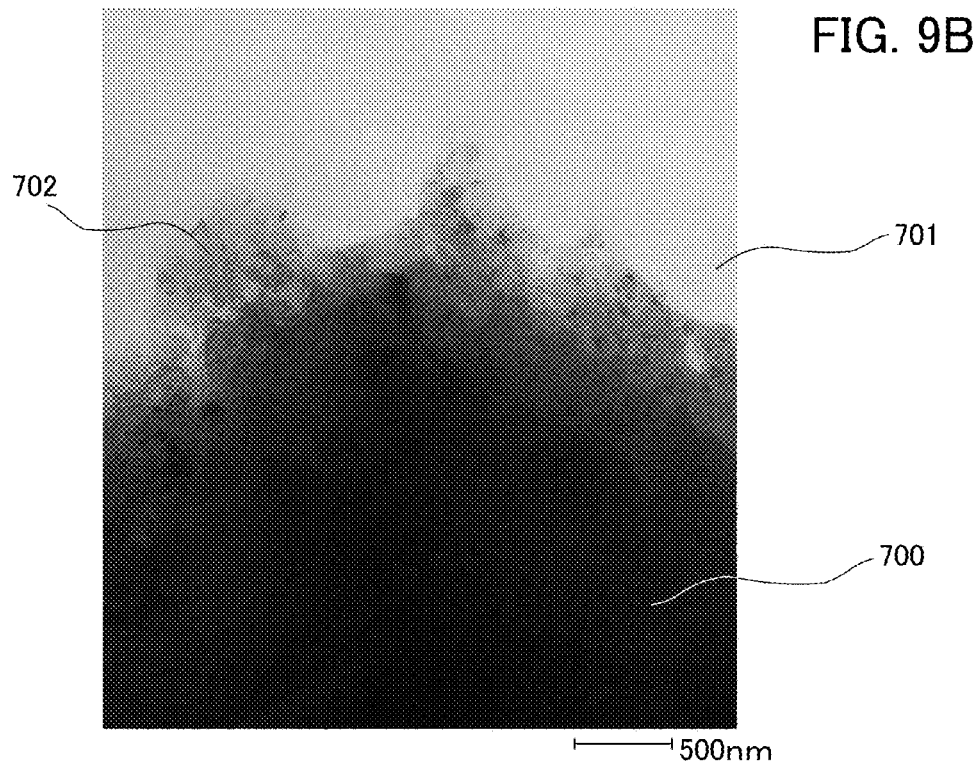
Figure 10:
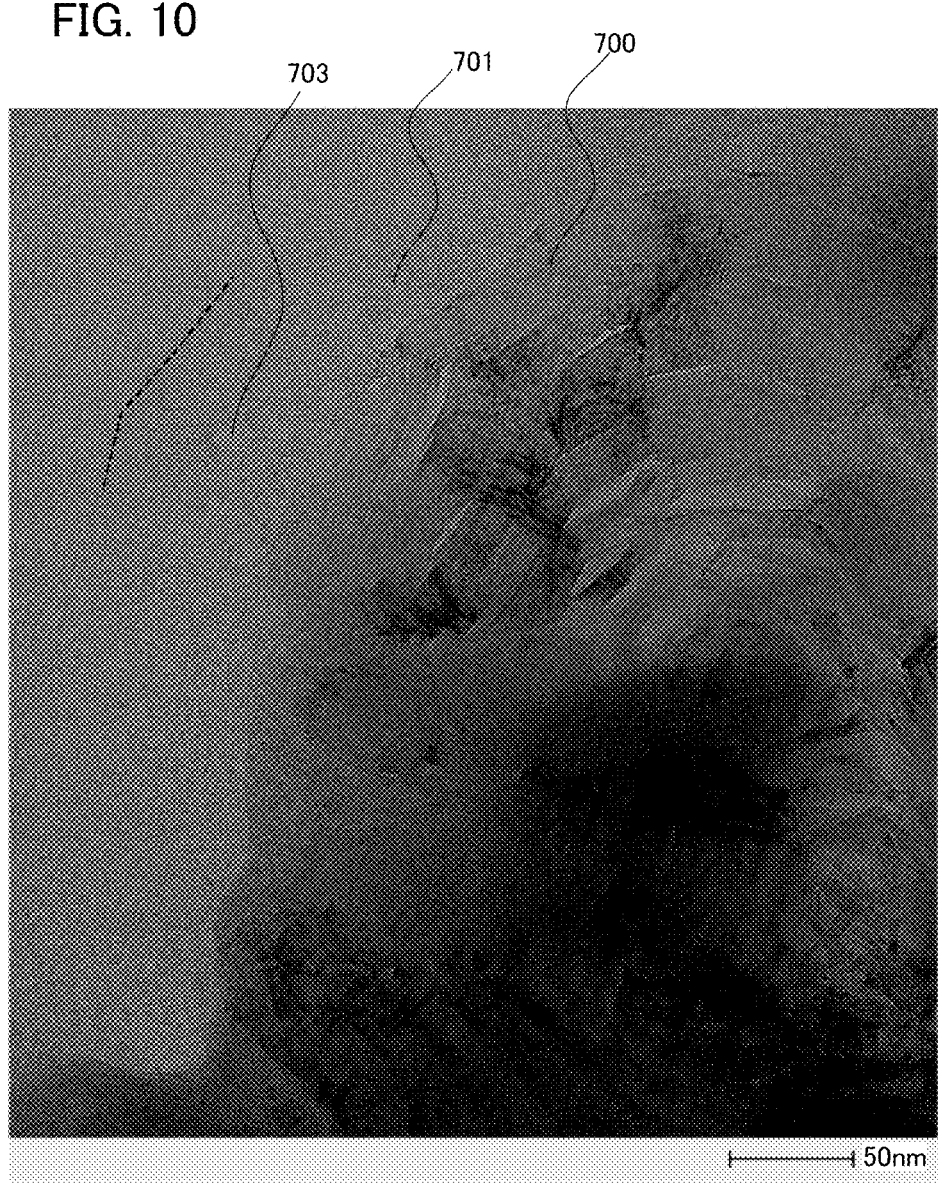
FIG. 10 is a TEM image of an active material layer.

The active material layer of Electrode A formed in the above manner was observed with a scanning electron microscope (SEM) and a transmission electron microscope (TEM). FIGS. 8A and 8B show observation results of the surface of the active material layer in the power storage device electrode of one embodiment of the present invention obtained with the SEM. The active material layer uses the binder containing the carboxyl group. FIGS. 9A and 9B and FIG. 10 show observation results of the cross-section of the active material layer obtained with the TEM. FIGS. 11A to 11E and FIGS. 12A and 12B show results of elementary analysis on the active material layer by energy dispersive X-ray spectroscopy (EDX (also referred to as EDS)).

As shown in FIGS. 8A and 8B, a plurality of graphite particles 700 can be observed in the active material layer. The surface of the active material layer in FIG. 8A was observed at 3000-fold magnification, and the surface of the active material layer in FIG. 8B was observed at 10000-fold magnification. The graphite particles 700 are each covered with a coating film 701. The coating film 701 extends to one of the plurality of the graphite particles 700 to the other thereof to connect the plurality of graphite particles 700. Note that on the surface of the graphite particle 700, a plurality of fine graphite particles 702 having a diameter smaller than that of the graphite particle 700 are observed. The fine graphite particles 702 do not exist alone but are formed at the time of forming the graphite particles 700; the fine graphite particles 702 are part of the graphite particles 700. In this example, experiments were conducted with the use of the graphite particles 700 in such shapes.

FIGS. 9A and 9B are TEM images of one of the graphite particles 700 and a cross-sectional shape around the graphite particle 700.

FIG. 9A is the TEM image showing the whole graphite particle 700 and the cross-sectional shape of the coating film 701 formed around the graphite particle 700.

FIG. 9B is an enlarged TEM image of part of the cross-section in FIG. 9A. The image of FIG. 9A was taken at 27500-fold magnification and the image of FIG. 9B was taken at 55000-fold magnification. The diameter of the graphite particle 700 in FIGS. 9A and 9B is approximately 4 μm to 6 μm. On the surface of the graphite particle 700 used in this example, the plurality of fine graphite particles 702 are attached. The TEM images show that the fine graphite particles 702 are crystalline. Surfaces of the fine graphite particles 702 are covered with the coating film 701.

FIG. 10 is an enlarged TEM image of part of the cross-section in FIG. 9B. The image of FIG. 10 was taken at 480000-magnification. A periodic arrangement of atoms can be observed in the graphite particle 700, which indicates that the graphite particle 700 is crystalline. On the other hand, a periodic arrangement of atoms is not observed in the coating film 701 provided on the surface of the graphite particle 700, which indicates that the coating film 701 is amorphous.

The coating film 701 is formed on the surface of the graphite particle 700. The surface of the coating film 701 is shown by the dotted line in FIG. 10. The coating film has a thickness in the range of approximately 60 nm to 200 nm.

Here, in the coating film 701, a plurality of pores 703 are formed. This suggests that the coating film 701 is spongy. The pores 703 each have a diameter of 2 nm to 20 nm. The pores 703 have various sizes and are non-uniformly dispersed in the coating film 701.

FIGS. 11A to 11E are images of results of an element mapping obtained by EDX analysis performed on the active material layer to check the components of the coating film 701.

FIG. 11A is a TEM image showing the graphite particle 700 and the coating film 701 around the graphite particle 700 on which the element mapping was performed. FIGS. 11B to 11E show the results of the mapping performed for each element in the region observed with the TEM. FIG. 11B shows the result of detecting carbon (C) three-dimensionally in the region; FIG. 11C, the result of detecting fluorine (F); FIG. 11D, the result of detecting oxygen (O); and FIG. 11E, the result of detecting silicon (Si).

In the images of the results of the element mapping, white bright portions are regions where the elements are contained. As a result of the element mapping, Si, O, C, and F are detected clearly around the region showing the graphite particle 700. This indicates that the coating film 701 covering the surface of the graphite particle 700 is silicon oxide containing C and F as its main components.

Figure 12A:
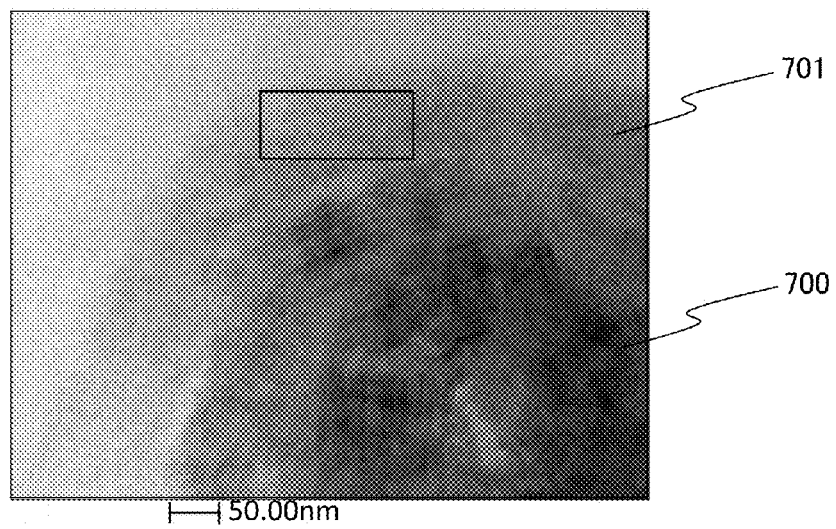
FIGS. 12A and 12B are results of EDX analysis performed on a coating film.
Figure 12B:
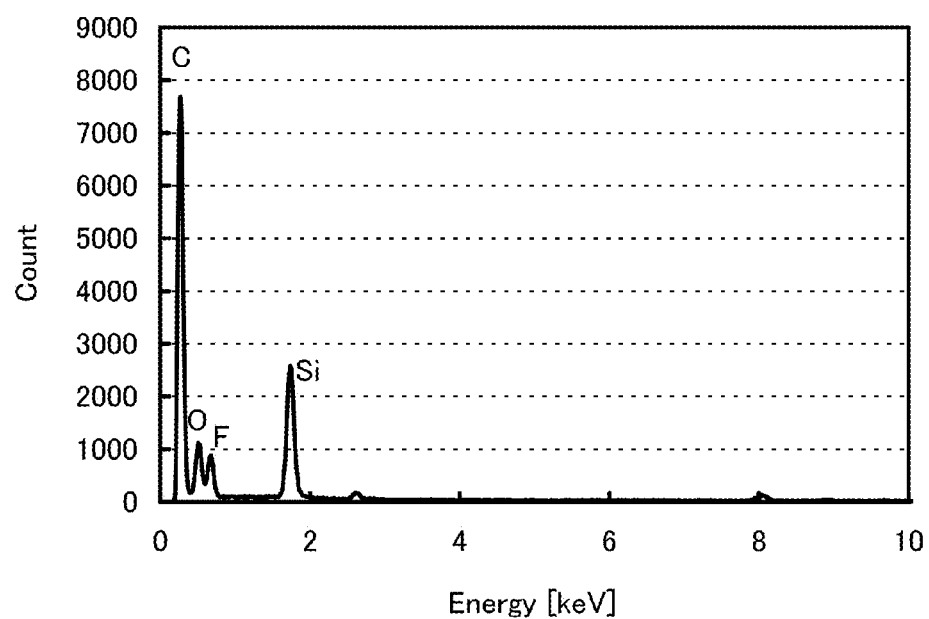

FIGS. 12A and 12B show results of analyzing elements in a predetermined region in the coating film 701. The elements in a region shown by the solid line in FIG. 12A were analyzed with EDX. The analysis results of the elements are shown in FIG. 12B. As a result of the EDX analysis, peaks of carbon (C), oxygen (O), fluorine (F), and silicon (Si) (K-lines) each corresponding to the level as a main component were detected. This also indicates that the coating film 701 covering the surface of the graphite particle 700 is silicon oxide containing C and F as its main components.

(Formation of Electrode B and Observation of Active Material Layer Thereof)

Next, an electrode the amount of which is ten times that of Electrode A was formed on the assumption that the power storage device electrode of one embodiment of the present invention is in mass production. In an application step of the electrode, the performance of the application depends on the viscosity of slurry. For this reason, at the time of forming the electrode the amount of which is ten times that of Electrode A, an N-methyl-2-pyrrolidone (NMP) solution with a high PVdF content, i.e., an NMP solution including 12 wt % polyvinylidene fluoride (PVdF) was used; moreover, the viscosity of slurry can be adjusted by adding NMP. That is, slurry which contains a 18.6-g NMP solution including 12 wt % PVdF and 20-g graphite particles and in which the amount of additional NMP was 3.6 g was used to form a power storage device electrode. Conditions other than the above were similar to those of Electrode A. Hereinafter the power storage device electrode formed in the above manner is referred to as Electrode B.

Figure 13A:
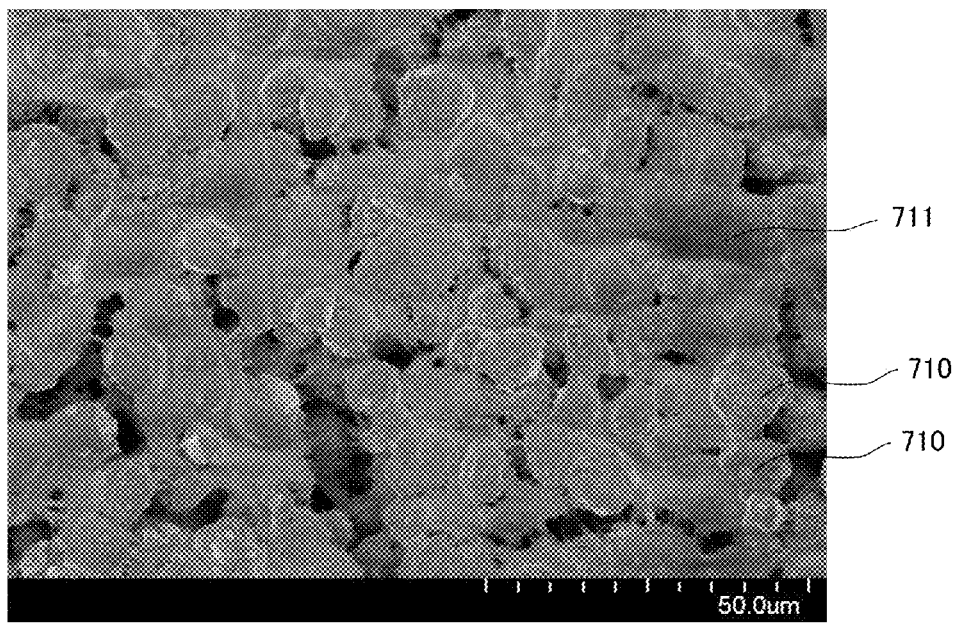
FIGS. 13A and 13B are SEM images of an active material layer.
Figure 13B:
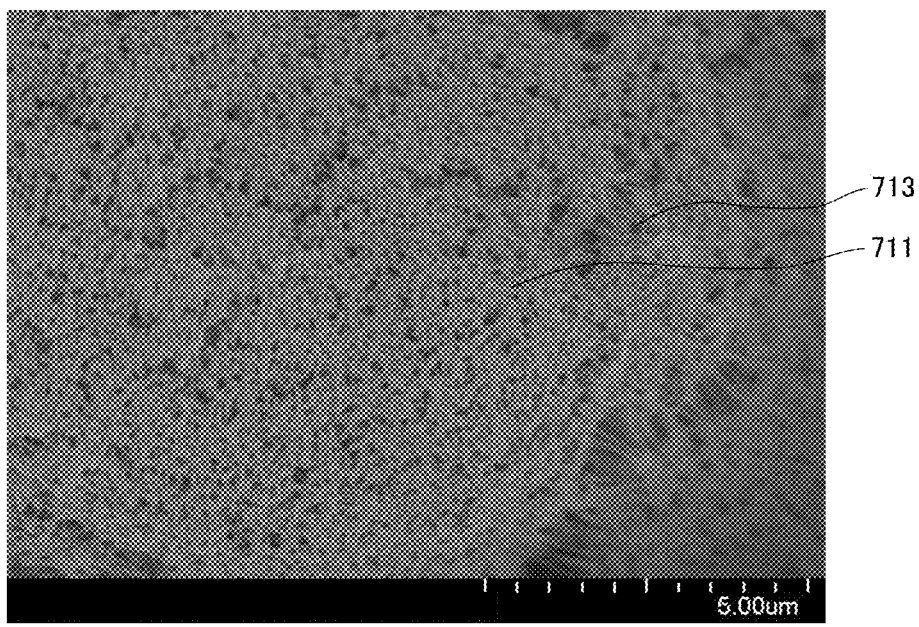
Figure 14:
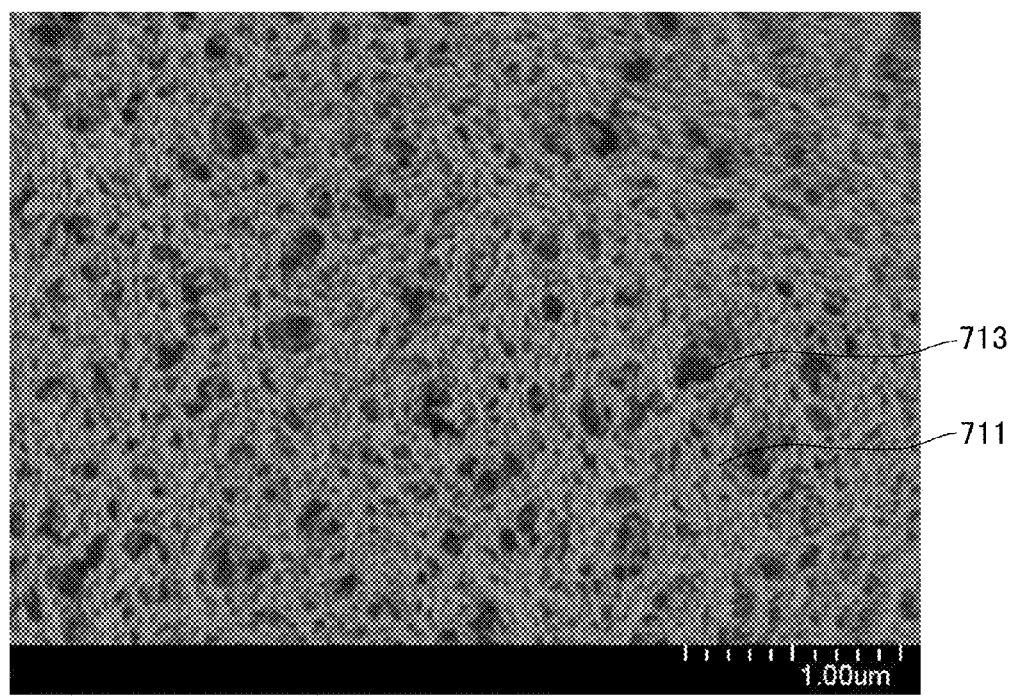
FIG. 14 is a SEM image of an active material layer.

FIGS. 13A and 13B and FIG. 14 are SEM images of an active material layer of Electrode B. As in Electrode A, surfaces of a plurality of graphite particles 710 are covered with a coating film 711. When a surface of the coating film 711 was enlarged and observed, however, a number of pores 713 were observed in the coating film 711 as shown in FIG. 13B and FIG. 14. Although the pores 703 can also be observed in the TEM image of the cross-section of Electrode A, the pores 713 in Electrode B are more apparent than the pores 703 in Electrode A. Accordingly, the coating film 711 is spongy. It is probable that such a spongy coating film is formed due to foam caused by a gas of ammonium or the like generated at the time of forming silicon oxide from perhydropolysilazane.

Figure 15A:
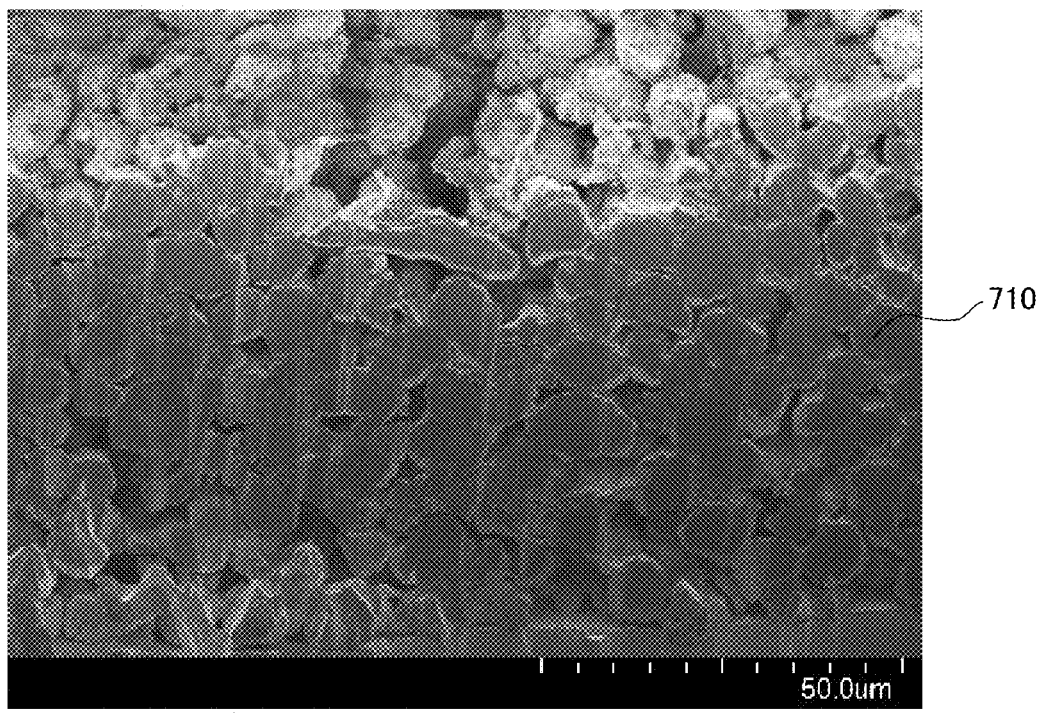
FIGS. 15A and 15B are SEM images of a cross-section of an active material layer.
Figure 15B:
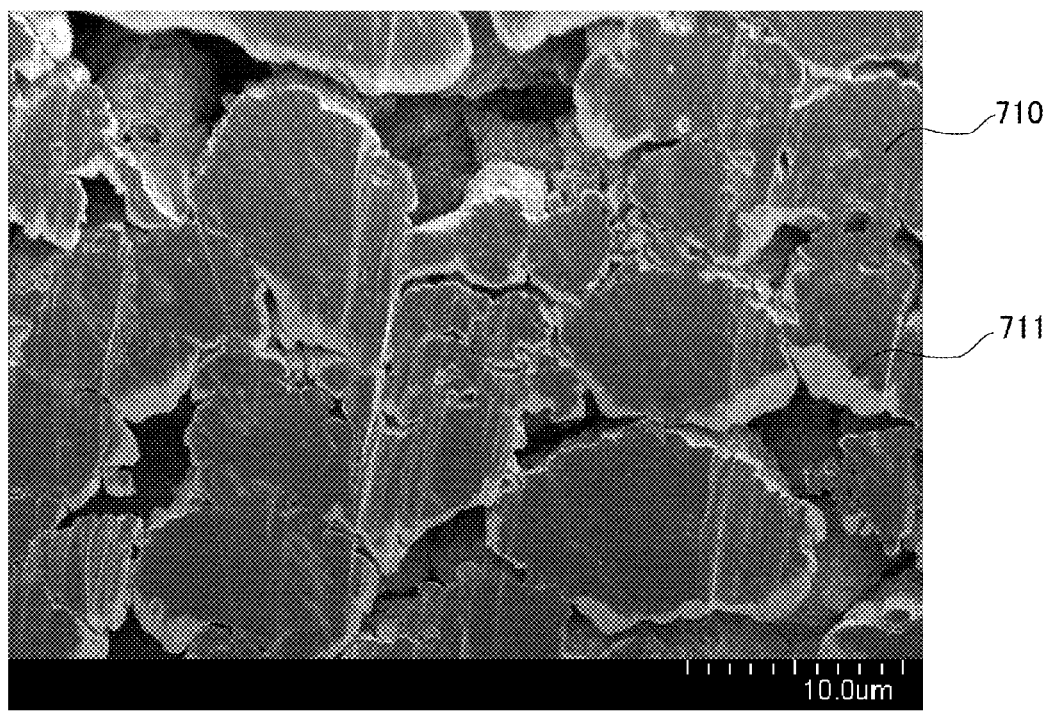

FIG. 15A is a SEM image of the cross-section of the active material layer; FIG. 15B is a SEM image showing an enlarged view of part of the cross-section in FIG. 15A.

In FIGS. 15A and 15B, a stack of the plurality of graphite particles 710 is included in the active material layer. The coating film 711 on the surfaces of the graphite particles 710 can be observed. Each of the graphite particles 710 is not separately covered with the coating film 711 but a surface of an aggregate of the graphite particles 710 in direct contact with each other is covered with the coating film 711. The graphite particles 710 are probably in contact with each other in the depth direction of the SEM image. Thus, the graphite particles 710 form a three-dimensional conductive path.

(Formation of Electrode C and Electrode D for Comparison and Observation of Active Material Layer Thereof)

For comparison with Electrode A and Electrode B, Electrode C including a coating film formed using a binder which does not contain a carboxyl group and Electrode D which does not include a coating film were formed.

Electrode C was formed in the same conditions as Electrode A except that PVdF which does not contain a carboxyl group was used.

Figure 16A:
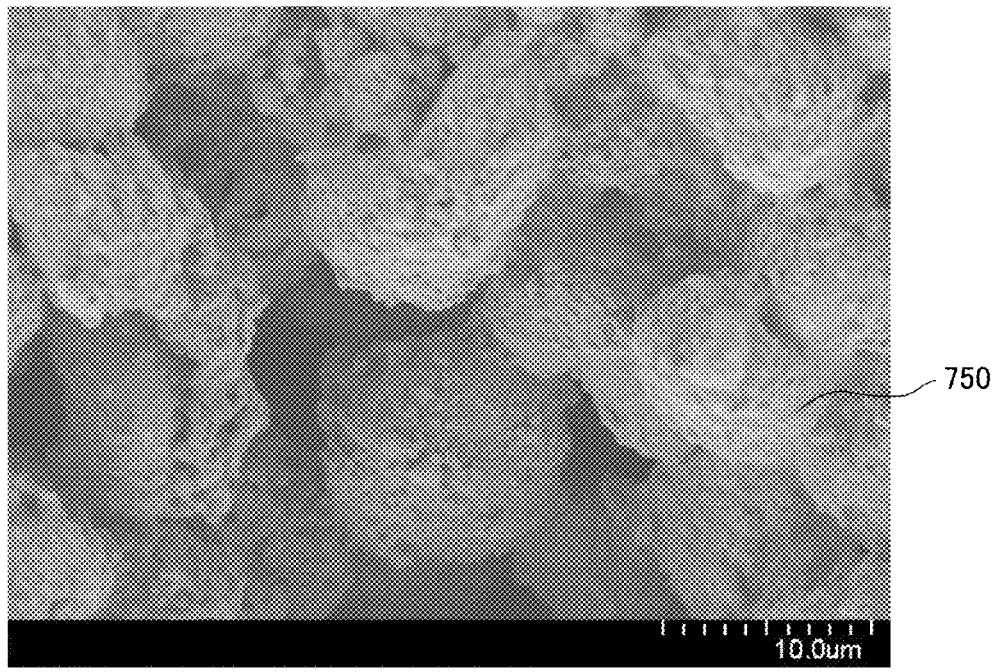
FIGS. 16A and 16B are SEM images of an active material layer.
Figure 16B:
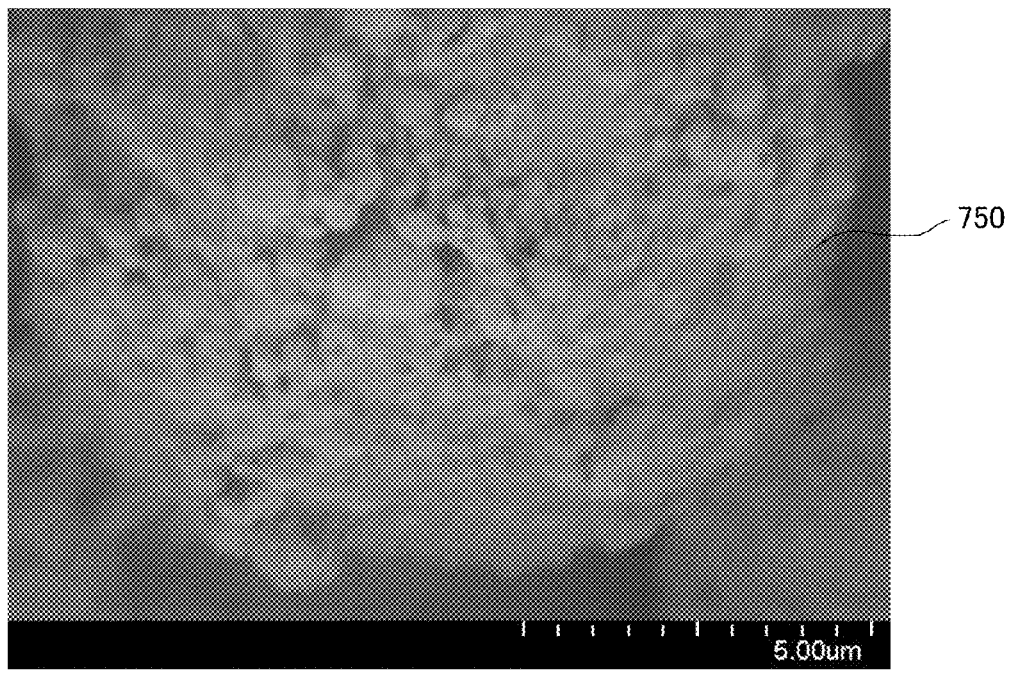

FIGS. 16A and 16B are SEM images of an active material layer of Electrode C. Although a coating film is entirely formed on surfaces of a plurality of graphite particles 750, a spongy coating film is not observed.

In Electrode D, a coating film was not formed. In other words, Electrode D was formed through the formation steps illustrated in FIG. 3 without performing the step of adding perhydropolysilazane (Step S151).

Figure 17A:
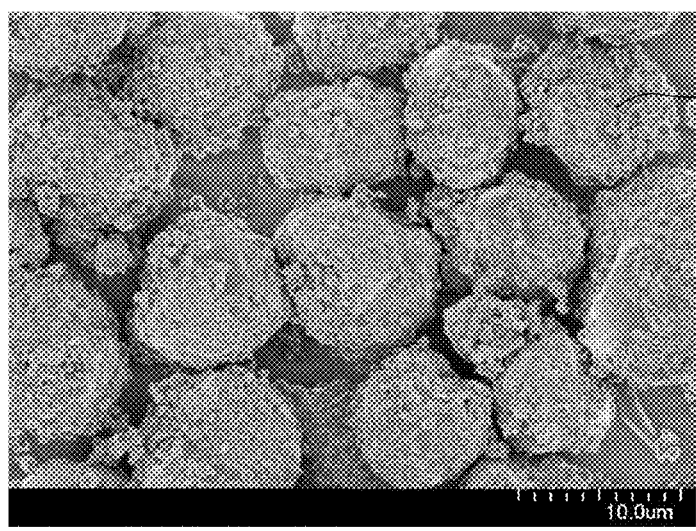
FIGS. 17A to 17C are SEM images of an active material layer.
Figure 17B:
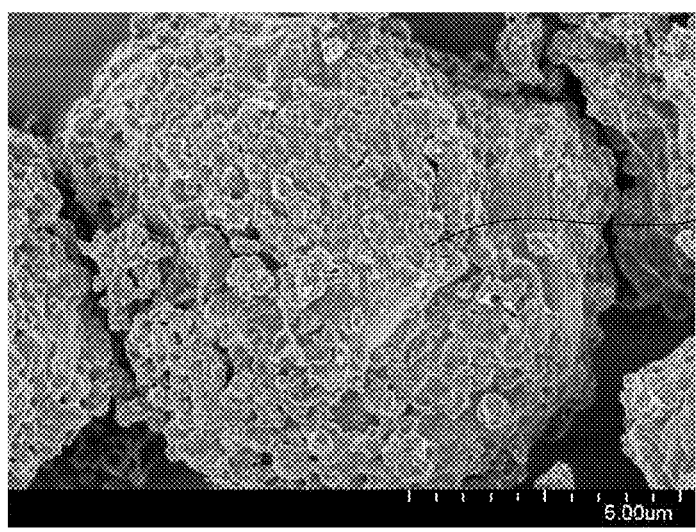
Figure 17C:
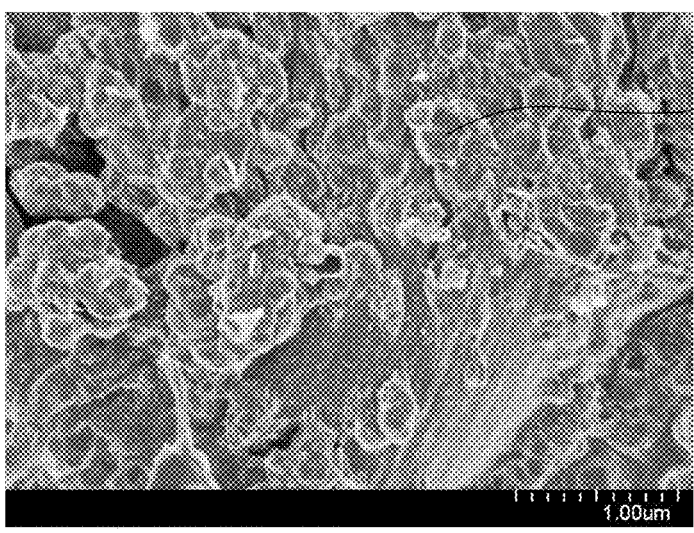

FIGS. 17A to 17C are SEM images of an active material in Electrode D. Unevenness formed of a plurality of fine graphite particles 761 or the like is clearly observed on a surface of a graphite particle 760 that is the active material. It is needless to say that a coating film is not formed on the graphite particle 760.

(Measurement of Cycle Characteristics)

Next, Electrodes A to D described above were included in cells and the cycle characteristics thereof were measured.

Each of the cells was a CR2032 coin-cell battery (20 mm in diameter and 3.2 mm high). In the cell, an electrode including $LiFePO_4$ as an active material was used as a positive electrode; 25-μm-thick polypropylene (PP) was used as a separator; and an electrolyte solution formed in such a manner that lithium hexafluorophosphate ($LiPF_6$) was dissolved at a concentration of 1 mol/L in a solution in which ethylene carbonate (EC) and diethyl carbonate (DEC) were mixed in a volume ratio of 1:1 was used. Initial charging and discharging were performed at a constant current and a 0.2 C rate. Then, charging and discharging at a constant current and a 1 C rate were repeated to perform a cycle test. The upper limit voltage was 4.0 V, and the lower limit voltage was 2 V. The measurement temperature was 60° C.

Figure 18:
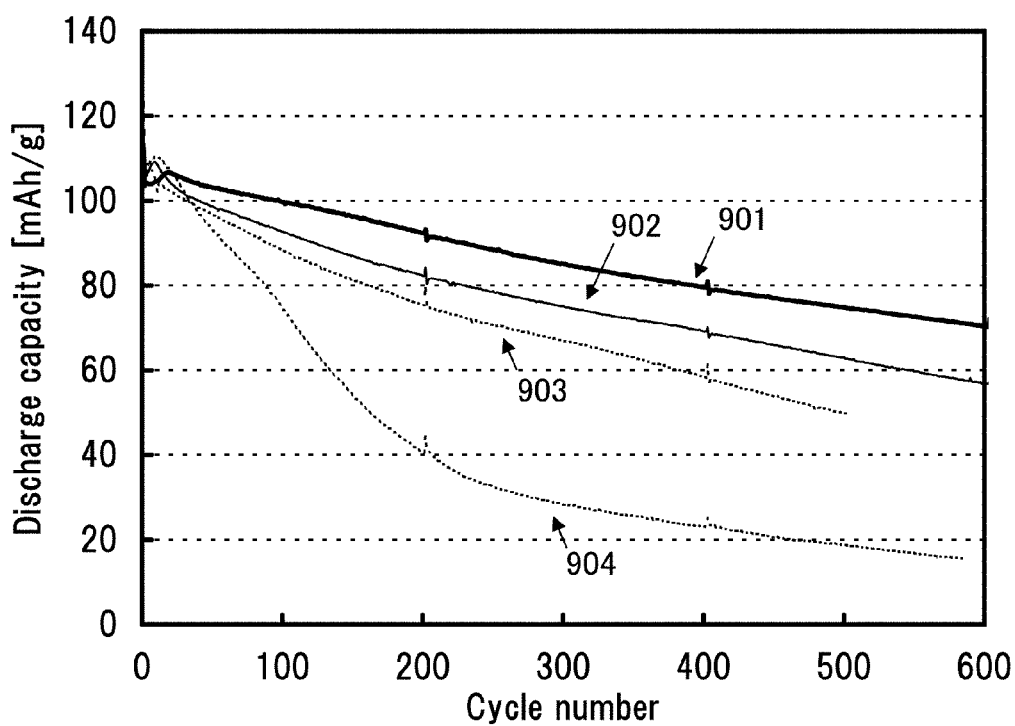
FIG. 18 shows cycle characteristics of electrodes.
Figure 19:
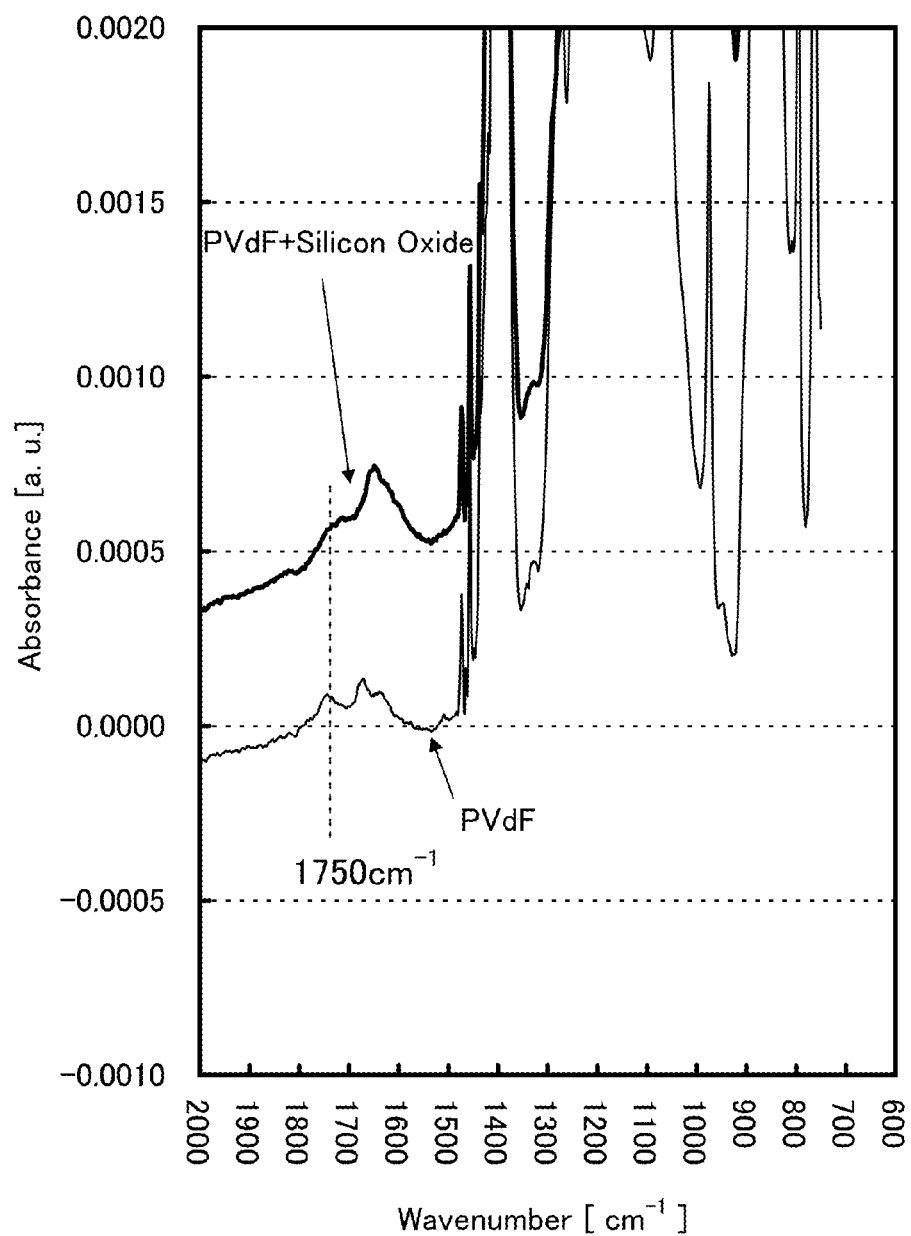
FIG. 19 shows results of IR measurement.

FIG. 18 shows measurement results of the discharge characteristics of the cells. The horizontal axis represents the number of cycles (times) and the vertical axis represents discharge capacity (mAh/g) of the cells. A curve 902 shows the cycle characteristics of the cell using Electrode A and a curve 901 shows the cycle characteristics of the cell using Electrode B. Electrode A and Electrode B each include the coating film formed using the binder containing a carboxyl group. A curve 903 shows the cycle characteristics of the cell using Electrode C including the coating film formed using the binder which does not contain a carboxyl group. A curve 904 shows the cycle characteristics of the cell using Electrode D which does not include a coating film.

In the measurement results, the discharge capacity of the cell using Electrode D which does not include a coating film is rapidly decreased as the number of cycles is increased as shown by the curve 904. The discharge capacity is decreased to approximately 40 mAh/g in the 200th cycle, and to approximately 20 mAh/g in the 500th cycle, which indicates significant deterioration.

In contrast, a rapid decrease in discharge capacity is reduced in the cells using Electrode A, Electrode B, and Electrode C each including the active material provided with the coating film, which indicates slow deterioration with increasing numbers of cycles. This suggests that with the active material provided with the coating film, cycle deterioration of discharge capacity can be reduced even in an environment at a high temperature of 60° C.

In addition, the curve 901 and the curve 902 show a decrease in the discharge capacity more gradual than that in the curve 903; this suggests that the cell using Electrode A and the cell using Electrode B exhibit more favorable cycle characteristics than that of the cell using Electrode C. As described above, the coating film provided on the active material of each of Electrode A and Electrode B is a spongy shape including a plurality of pores. It is found that the shape greatly contributes to an improvement in the cycle characteristics.

Moreover, the cell using Electrode B has more favorable characteristics than the cell using Electrode A. As described above, the coating film on the active material used in Electrode B includes a larger number of pores and is spongier than the coating film on the active material used in Electrode A. This indicates that as the proportion of pores in a coating film is high, the cycle characteristics of a cell are improved. Although the compounding ratio of graphite particles to PVdF and perhydropolysilazane in Electrode A is the same as that in Electrode B, the shapes of the coating films which were formed are different, resulting in a difference in an improvement in the cycle characteristics. This is because the amount of moisture slightly contained in the NMP of the NMP solution including 8 wt % PVdF used in the formation of Electrode A is different from that in the NMP of the NMP solution including 12 wt % PVdF used in the formation of Electrode B. When moisture is contained in slurry, a gas of $NH_3$ or the like is generated due to the reaction with perhydropolysilazane; thus, the spongy shape of a coating film might vary depending on the moisture content.

Consequently, by using a power storage device electrode in which a spongy coating film is formed on surfaces of active material particles, generation of irreversible capacity causing a decrease in charge and discharge capacity of a power storage device can be reduced and electrochemical decomposition of an electrolyte solution or the like on a surface of an electrode can be reduced or inhibited. Further, it is possible to improve the cycle characteristics of the power storage device. Furthermore, the decomposition reaction of the electrolyte solution, which speeds up at high temperature, is reduced or inhibited and a decrease in capacity at the time of charging and discharging at high temperature is prevented, so that the operating temperature range of the power storage device can be extended.

Example 2

As another example, the power storage device electrode of one embodiment of the present invention was formed and the characteristics thereof were measured.

(Formation of Electrode E and Electrode F)

First, as described in Embodiment 2, slurry was prepared to form an electrode. Slurry A and Slurry B were formed in different conditions which differ in length of stirring time after dropping a perhydropolysilazane solution.

First, a step of forming Slurry A and a step of forming Slurry B are described. Graphite particles with an average diameter of 9 μm described in Example 1 were used to form each of Slurry A and Slurry B. The graphite particles with an average diameter of 9 μm were added to N-methyl-2-pyrrolidone (NMP) including 12 wt % polyvinylidene fluoride (PVdF), and the mixture was stirred in a mixer at 2000 rpm for 10 minutes three times. The amount of the graphite particles was 2 g, and the amount of the NMP solution including 12 wt % PVdF was 1.86 g. A carboxyl group was contained in the PVdF. Then, a perhydropolysilazane solution was dropped to the mixture.

The mixture was stirred in the mixer at 2000 rpm once. At this time, the stirring time was 3 minutes for Slurry A and 10 minutes for Slurry B. In each of Slurry A and Slurry B, exclusive of the NMP, the graphite particles, the PVdF, and silicon oxide were mixed in a weight ratio of 88:9.8:2.2. Slurry A and Slurry B were each formed in a dry room to prevent entry of moisture.

Next, description is given of a step of forming an electrode with the use of Slurry A and a step of forming an electrode with the use of Slurry B. Note that the electrode using Slurry A and the electrode using Slurry B were formed in similar steps. Slurry A and Slurry B were each applied over copper foil serving as a current collector at a rate of 10 mm/sec with a blade coating apparatus. The current collector to which the slurry was applied was dried by ventilation drying at 70° C. for 20 minutes to evaporate a polar solvent. The application step and the drying step were performed in the dry room, as in the case of the step of forming the slurry. When the current collector to which the slurry was applied is carried out of the dry room during the steps, perhydropolysilazane reacts with moisture in the air, so that the slurry is foamed due to the generation of $NH_3$ and $H_2$. Therefore, the above steps are preferably performed in a dry room or an environment equivalent to the dry room.

Next, baking was performed in the air at 150° C. for 1 hour in a draft chamber with a hot plate to form a coating film on the active material. Through the step, the electrodes were each baked and hydrolysis of the perhydropolysilazane proceeded to form silicon oxide. Here, —OH in the carboxyl group contained in the PVdF reacted with the perhydropolysilazane to generate $NH_3$ and $H_2$. Thus, the coating film covering the surface of the active material became spongy silicon oxide having a plurality of pores. Moreover, the silicon oxide contains C and F as its main components in addition to Si and O by the reaction with the PVdF. Note that the reaction probably started in the step for forming the slurry in which the PVdF and the perhydropolysilazane were mixed at room temperature.

Next, heating was performed in a reduced pressure atmosphere at 170° C. for 10 hours to dry the electrodes. The electrodes were each pressed to compress an active material layer, and then stamped out to form a negative electrode for a power storage device. Of the negative electrodes for a power storage device formed in such a manner, the negative electrode for a power storage device formed using Slurry A is referred to as Electrode E, and the negative electrode for a power storage device formed using Slurry B is referred to as Electrode F. In each of Electrode E and Electrode F, the proportion of the coating film in the active material layer is 2.5 wt %.

(Formation of Electrode G and Electrode H)

Next, with the use of graphite particles with an average diameter of 11 μm, Electrode G and Electrode H were formed by the method described in Embodiment 2. The graphite particles were different from those used in the formation steps of Electrode E and Electrode F. In forming Electrode G and Electrode H, the same steps were performed to form and apply slurry but drying steps were different. First, slurry was formed.

First, the step of forming the slurry is described. The graphite particles with an average diameter of 11 μm were added to N-methyl-2-pyrrolidone (NMP) including 12 wt % polyvinylidene fluoride (PVdF), and the mixture was stirred in a mixer at 2000 rpm for 10 minutes three times. The amount of the graphite particles was 4 g, and the amount of the NMP solution including 12 wt % PVdF was 3.7 g. A carboxyl group was contained in the PVdF. Then, a perhydropolysilazane solution was dropped to the mixture.

The mixture was stirred and mixed in the mixer at 2000 rpm for 3 minutes once. In the slurry, exclusive of the NMP, the graphite particles, the PVdF, and silicon oxide were mixed in a weight ratio of 88:9.8:2.2. The slurry was formed in a dry room to prevent entry of moisture.

Next, description is given of a step of forming each electrode with the use of the slurry. The slurry was applied over copper foil serving as a current collector at a rate of 10 mm/sec with a blade coating apparatus. The current collector to which the slurry was applied was dried by ventilation drying at 70° C. for 20 minutes to evaporate a polar solvent. The application step and the drying step were performed in the dry room, as in the case of the step of forming the slurry. When the current collector to which the slurry was applied is carried out of the dry room during the steps, perhydropolysilazane reacts with moisture in the air, so that the slurry is foamed due to the generation of $NH_3$ and $H_2$. Therefore, the above steps are preferably performed in a dry room or an environment equivalent to the dry room.

Next, baking was performed in a draft chamber with a hot plate to form a coating film on the active material. Electrode G was baked in the air at 150° C. for 1 hour. On the other hand, Electrode H was subjected to heat treatment at 70° C. for 1 hour and then was baked in the air at 150° C. for 1 hour. Through the step, each of the electrodes was baked and hydrolysis of the perhydropolysilazane proceeded to form silicon oxide. Here, —OH in the carboxyl group contained in the PVdF reacted with the perhydropolysilazane to generate $NH_3$ and $H_2$. Thus, the coating film covering the surface of the active material became spongy silicon oxide having a plurality of pores. Moreover, the silicon oxide contains C and F as its main components in addition to Si and O by the reaction with the PVdF. Note that the reaction probably started in the step for forming the slurry in which the PVdF and the perhydropolysilazane were mixed at room temperature.

Next, heating was performed in a reduced pressure atmosphere at 170° C. for 10 hours to dry Electrode G and Electrode H. The electrodes were each pressed to compress an active material layer, and then stamped out to form a negative electrode for a power storage device. In each of Electrode G and Electrode H, the proportion of the coating film in the active material layer is 2.5 wt %.

(Formation of Electrode J and Electrode K for Comparison)

For comparison with Electrode E, Electrode F, Electrode G, and Electrode H, Electrode J and Electrode K each of which does not include a coating film were formed. Graphite particles similar to those used in the formation steps of Electrode G and Electrode H were used. In Electrode K, carbon nanofibers were used as a conductive additive.

In Electrode J, a coating film was not formed. In other words, Electrode J was formed through the formation steps illustrated in FIG. 3 without performing the step of adding perhydropolysilazane (Step S151).

In Electrode K, a coating film was not formed as in Electrode J, and carbon nanofibers were used as the conductive additive. In slurry for forming Electrode K, exclusive of NMP, the graphite particles, PVdF, and the carbon nanofibers were mixed in a weight ratio of 88:10:2.

(Measurement of Cycle Characteristics)

Next, Electrode E, Electrode F, Electrode G, Electrode H, Electrode J, and Electrode K described above were included in cells and the cycle characteristics thereof were measured.

Each of the cells was a single-layer laminated cell. In the laminated cell, the area of a positive electrode is 20.5 cm$^2$ and the area of the negative electrode is 23.8 cm$^2$. In the cell, an electrode including $LiFePO_4$ as an active material was used as the positive electrode; 25-μm-thick polypropylene (PP) was used as a separator; and an electrolyte solution formed in such a manner that lithium hexafluorophosphate ($LiPF_6$) was dissolved at a concentration of 1 mol/L in a solution in which ethylene carbonate (EC) and diethyl carbonate (DEC) were mixed in a volume ratio of 3:7 was used. Initial charging and discharging were performed at a constant current and a 0.2 C rate. Then, charging and discharging at a constant current and a 1 C rate were repeated to perform a cycle test. The upper limit voltage was 4.0 V, and the lower limit voltage was 2 V. The measurement temperature was 60° C.

Figure 20:
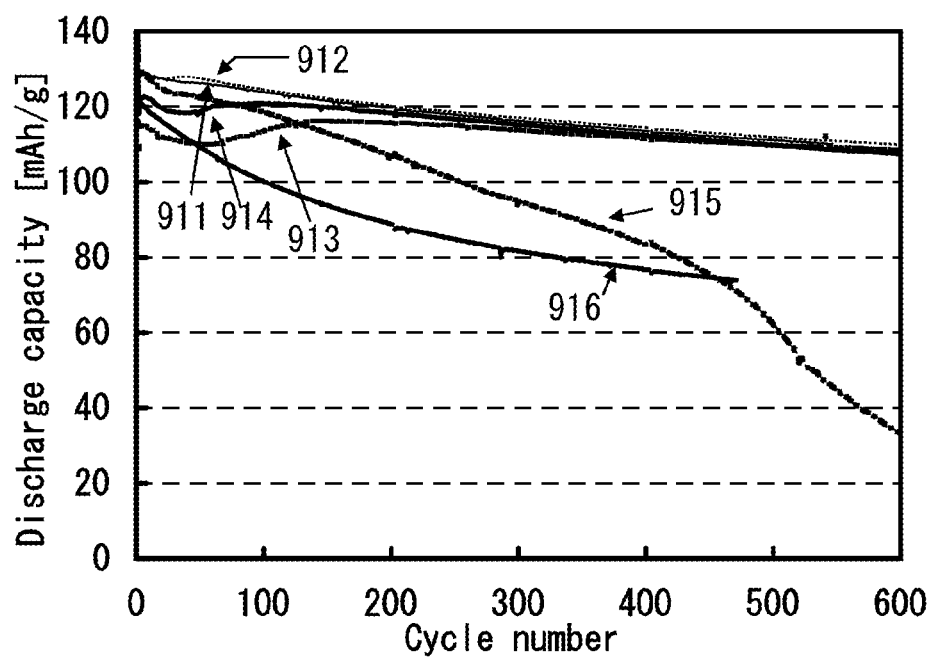
FIG. 20 shows cycle characteristics of electrodes.

FIG. 20 shows measurement results of the discharge characteristics of the cells. The horizontal axis represents the number of cycles (times) and the vertical axis represents discharge capacity (mAh/g) of the cells. A curve 911, a curve 912, a curve 913, and a curve 914 show the cycle characteristics of the cells using Electrode E, Electrode F, Electrode G, and Electrode H, respectively. Electrode E, Electrode F, Electrode G, and Electrode H each include a coating film formed using a binder containing a carboxyl group. A curve 915 and a curve 916 show the cycle characteristics of the cells using Electrode J and Electrode K, respectively. Electrode J and Electrode K each do not include a coating film.

In the measurement results, the discharge capacity of the cell using Electrode J which does not include a coating film is rapidly decreased as the number of cycles is increased as shown by the curve 915. The discharge capacity is decreased to 83 mAh/g in the 400th cycle. The discharge capacity of the cell using Electrode K which also does not include a coating film and in which carbon nanofibers were used as the conductive additive is decreased to 77 mAh/g in the 400th cycle as shown in the curve 916.

In contrast, a rapid decrease in discharge capacity is reduced in the cells using Electrode E, Electrode F, Electrode G, and Electrode H each including the active material provided with the coating film, which indicates slow deterioration with increasing numbers of cycles. This suggests that with the active material provided with the coating film, cycle deterioration of discharge capacity can be reduced even in an environment at a high temperature of 60° C.

Consequently, by using a power storage device electrode in which a spongy coating film is formed on surfaces of active material particles, generation of irreversible capacity causing a decrease in charge and discharge capacity of a power storage device can be reduced and electrochemical decomposition of an electrolyte on a surface of an electrode can be reduced or inhibited. Further, it is possible to improve the cycle characteristics of the power storage device. Furthermore, the decomposition reaction of the electrolyte solution, which speeds up at high temperature, is reduced or inhibited and a decrease in capacity at the time of charging and discharging at high temperature is prevented, so that the operating temperature range of the power storage device can be extended.

EXPLANATION OF REFERENCE

100: power storage device electrode, 101: current collector, 102: active material layer, 103: active material, 104: coating film, 105: pore, 110: active material, 111: coating film, 112: pore, 450: secondary battery, 451: positive electrode can, 452: negative electrode can, 453: gasket, 454: positive electrode, 455: positive electrode current collector, 456: positive electrode active material layer, 457: negative electrode, 458: negative electrode current collector, 459: negative electrode active material layer, 460: separator, 470: secondary battery, 471: positive electrode current collector, 472: positive electrode active material layer, 473: positive electrode, 474: negative electrode current collector, 475: negative electrode active material layer, 476: negative electrode, 477: separator, 478: exterior body, 480: secondary battery, 481: positive electrode cap, 482: battery can, 483: positive electrode terminal, 484: positive electrode, 485: separator, 486: negative electrode, 487: negative electrode terminal, 488: insulating plate, 489: insulating plate, 490: gasket (insulating packing), 491: PTC element, 492: safety valve mechanism, 500: house, 501: electric power system, 502: service wire, 503: distribution board, 504: control device, 505: power storage system, 506: solar power generation system, 507: display device, 508: lighting device, 509: air-conditioning system, 510: electric refrigerator, 511: Internet, 512: electric vehicle, 513: management server, 560: electric vehicle, 561: charging apparatus, 562: cable, 563: front wheel, 564: power storage device, 565: electronic control unit, 566: inverter unit, 567: drive motor unit, 568: output shaft, 569: drive shaft, 570: rear wheel (drive wheel), 571: connecting plug, 600: portable information terminal, 601: housing, 602: display portion, 603: button, 604: icon, 605: camera lens, 606: microphone, 607: speaker, 608: connection terminal, 609: solar cell, 610: camera lens, 611: charge and discharge control circuit, 612: power storage device, 613: DC-DC converter, 614: switch, 615: switch, 616: switch, 617: converter, 700: graphite particle, 701: coating film, 702: fine graphite particle, 703: pore, 710: graphite particle, 711: coating film, 713: pore, 750: graphite particle, 760: graphite particle, 761: fine graphite particle, 901: curve, 902: curve, 903: curve, 904: curve, 911: curve, 912: curve, 913: curve, 914: curve, 915: curve, and 916: curve.

This application is based on Japanese Patent Application serial No. 2012-242706 filed with Japan Patent Office on Nov. 2, 2012, the entire contents of which are hereby incorporated by reference.

The invention claimed is:

1. A method for forming an electrode, comprising the steps of:
   forming a first mixture including a binder and an active material and a solvent, the binder including a carboxyl group;
   forming a second mixture by adding polysilazane to the first mixture;
   providing the second mixture over a current collector;
   drying the second mixture over the current collector to evaporate the solvent in a first environment having a dew point of −20° C. or less,
   after drying the second mixture, baking the second mixture to form a spongy film around the active material in a second environment having moisture more than the first environment, and
   wherein the spongy film has a plurality of pores.

2. The method for forming the electrode according to claim 1, wherein the carboxyl group reacts with the polysilazane to generate a gas during the step of baking.

3. The method for forming the electrode according to claim 2, wherein the gas includes ammonium and hydrogen.

4. The method for forming the electrode according to claim 1, wherein the binder includes the carboxyl group at greater than or equal to 1 wt % and less than 10 wt %.

5. The method for forming the electrode according to claim 1,
   wherein the steps of forming the first mixture, forming the second mixture, and providing the second mixture are performed in a dry room, and
   wherein the step of baking is performed in air.

6. The method for forming the electrode according to claim 5, wherein a dew point of the dry room is lower than or equal to −20° C.

7. The method for forming the electrode according to claim 1, wherein each of the plurality of pores has a diameter of greater than or equal to 2 nm and smaller than or equal to 20 nm.

8. The method for forming the electrode according to claim 1, wherein the spongy film comprises silicon and oxygen.

9. The method for forming the electrode according to claim 8, wherein the spongy film further comprises carbon and fluorine.

10. The method for forming the electrode according to claim 5,
   wherein the step of baking is performed after the second mixture is carried out from the dry room.

11. The method for forming the electrode according to claim 1, wherein at least one of steps of forming the first mixture, forming the second mixture, providing the second mixture, and drying the second mixture is performed in the first environment having the dew point of −20° C. or less.

* * * * *